US010507554B2

(12) United States Patent
DeLand et al.

(10) Patent No.: US 10,507,554 B2
(45) Date of Patent: Dec. 17, 2019

(54) METHODS FOR PROCESSING A WORKPIECE

(71) Applicant: The Boeing Company, Chicago, IL (US)

(72) Inventors: James Albert DeLand, Bothell, WA (US); Darrell Darwin Jones, Mill Creek, WA (US)

(73) Assignee: The Boeing Company, Chicago, IL (US)

(*) Notice: Subject to any disclaimer, the term of this patent is extended or adjusted under 35 U.S.C. 154(b) by 334 days.

(21) Appl. No.: 15/598,980

(22) Filed: May 18, 2017

(65) Prior Publication Data
US 2017/0252882 A1 Sep. 7, 2017

Related U.S. Application Data

(62) Division of application No. 14/174,331, filed on Feb. 6, 2014, now Pat. No. 9,700,978.
(Continued)

(51) Int. Cl.
B23Q 5/08 (2006.01)
B23B 35/00 (2006.01)
B23B 45/04 (2006.01)
B23B 23/00 (2006.01)
B25B 23/145 (2006.01)
B25B 23/00 (2006.01)

(52) U.S. Cl.
CPC ............. *B23Q 5/08* (2013.01); *B23B 35/00* (2013.01); *B23B 45/044* (2013.01); *B25B 23/0085* (2013.01); *B25B 23/1456* (2013.01); *B23B 2215/04* (2013.01); *B23B 2260/128* (2013.01); *B23P 2700/01* (2013.01); *Y10T 408/03* (2015.01)

(58) Field of Classification Search
CPC ......... B23Q 5/08; B23B 35/00; B23B 45/044; B23B 2215/04; B23B 2260/128; B25B 23/0085; B25B 23/1456; Y10T 408/03; B23P 2700/01
USPC .......................................................... 173/2
See application file for complete search history.

(56) References Cited

U.S. PATENT DOCUMENTS 3,344,797 A 10/1967 Gransten
3,601,285 A 8/1971 Leger et al.
(Continued)

FOREIGN PATENT DOCUMENTS

FR 2908680 A1 5/2008
JP S62203776 A 9/1987
(Continued)

OTHER PUBLICATIONS

"Japanese Application Serial No. 2015-005616, Office Action dated Jul. 10, 2018", 10 pgs.
(Continued)

Primary Examiner — Michelle Lopez
(74) Attorney, Agent, or Firm — Kwan & Olynick LLP

(57) ABSTRACT

A method of processing a workpiece comprises identifying processing locations on the workpiece, drilling a first hole at one of the processing locations using a rotary drive, sensing a flow of fluid while drilling, generating an operation signal based on the flow, comparing the duration interval of the operation signal to a predetermined temporal value, and drilling a different hole at a different processing location based on the duration interval and the temporal value.

20 Claims, 16 Drawing Sheets

Related U.S. Application Data

(60) Provisional application No. 61/931,819, filed on Jan. 27, 2014.

(56) References Cited

U.S. PATENT DOCUMENTS

| | | | |
|---|---|---|---|
| 4,385,533 | A | 5/1983 | Collins |
| 4,387,611 | A | 6/1983 | Junkers |
| 4,432,256 | A | 2/1984 | Aparicio, Jr. et al. |
| 4,562,756 | A | 1/1986 | Otsuki et al. |
| 4,768,388 | A | 9/1988 | Fader et al. |
| 4,829,196 | A | 5/1989 | Bronicki et al. |
| 4,886,680 | A | 12/1989 | Tindall |
| 5,027,661 | A | 7/1991 | Desaulniers et al. |
| 5,139,092 | A | 8/1992 | Boyle |
| 5,592,396 | A | 1/1997 | Tambini et al. |
| 5,888,032 | A | 3/1999 | Jensen |
| 5,926,913 | A | 7/1999 | Hernandez et al. |
| 6,205,853 | B1 | 3/2001 | Dei et al. |
| 6,427,558 | B1 | 8/2002 | DeLand |
| 7,398,836 | B2 | 7/2008 | Elmvist et al. |
| 9,700,978 | B2 | 7/2017 | DeLand et al. |
| 2004/0045729 | A1 | 3/2004 | Lehnert et al. |
| 2004/0068394 | A1 | 4/2004 | Maekawa et al. |
| 2006/0179637 | A1 | 8/2006 | Schueler |
| 2007/0058255 | A1 | 3/2007 | Imai et al. |
| 2010/0265097 | A1 | 10/2010 | Obatake et al. |
| 2011/0173823 | A1 | 7/2011 | Bailey et al. |
| 2011/0214890 | A1 | 9/2011 | Wallgren |
| 2013/0014368 | A1 | 1/2013 | Woods et al. |
| 2013/0175065 | A1 | 7/2013 | Terada et al. |
| 2015/0209927 | A1 | 7/2015 | DeLand et al. |

FOREIGN PATENT DOCUMENTS

| | | |
|---|---|---|
| JP | 2001500069 A | 1/2001 |
| JP | 2005121132 A | 5/2005 |
| JP | 2005262365 A | 9/2005 |
| JP | 2007164446 A | 6/2007 |
| JP | 2010247277 A | 11/2010 |
| JP | 2013035118 A | 2/2013 |
| JP | 2013517508 A | 5/2013 |
| JP | 2013139070 A | 7/2013 |
| WO | 2000016269 A1 | 3/2000 |

OTHER PUBLICATIONS

"U.S. Appl. No. 14/174,331, Notice of Allowance dated May 2, 2017", 8 pages.

"U.S. Appl. No. 14/174,331, Restriction Requirement dated Jul. 27, 2016", 5 pages.

"Control System Components, Engineering Manual of Automatic Controls, Control Fundamentals", Honeywell International 1997-2013, Retrieved from internet www.buildingcontrolworkbench.com/Portals/1/GrayBook/Gctrlcom.htm, pp. 1-8.

"European Application Serial No. 15151309.0-1709, dated Jun. 25, 2015", European Search Report, 8 pages.

"Unpublished U.S. Appl. No. 13/663,242, filed Oct. 29, 2012".

"Japanese Application Serial No. 2015-005616, Office Action dated Nov. 20, 2018", 12 pgs.

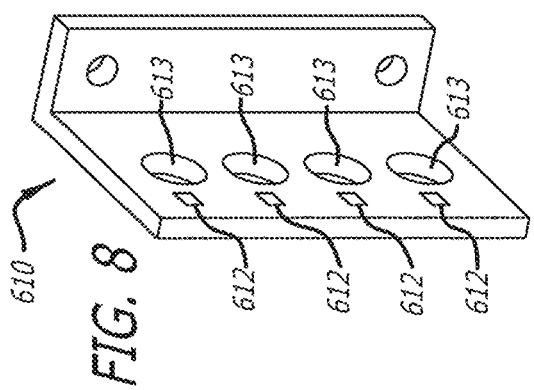
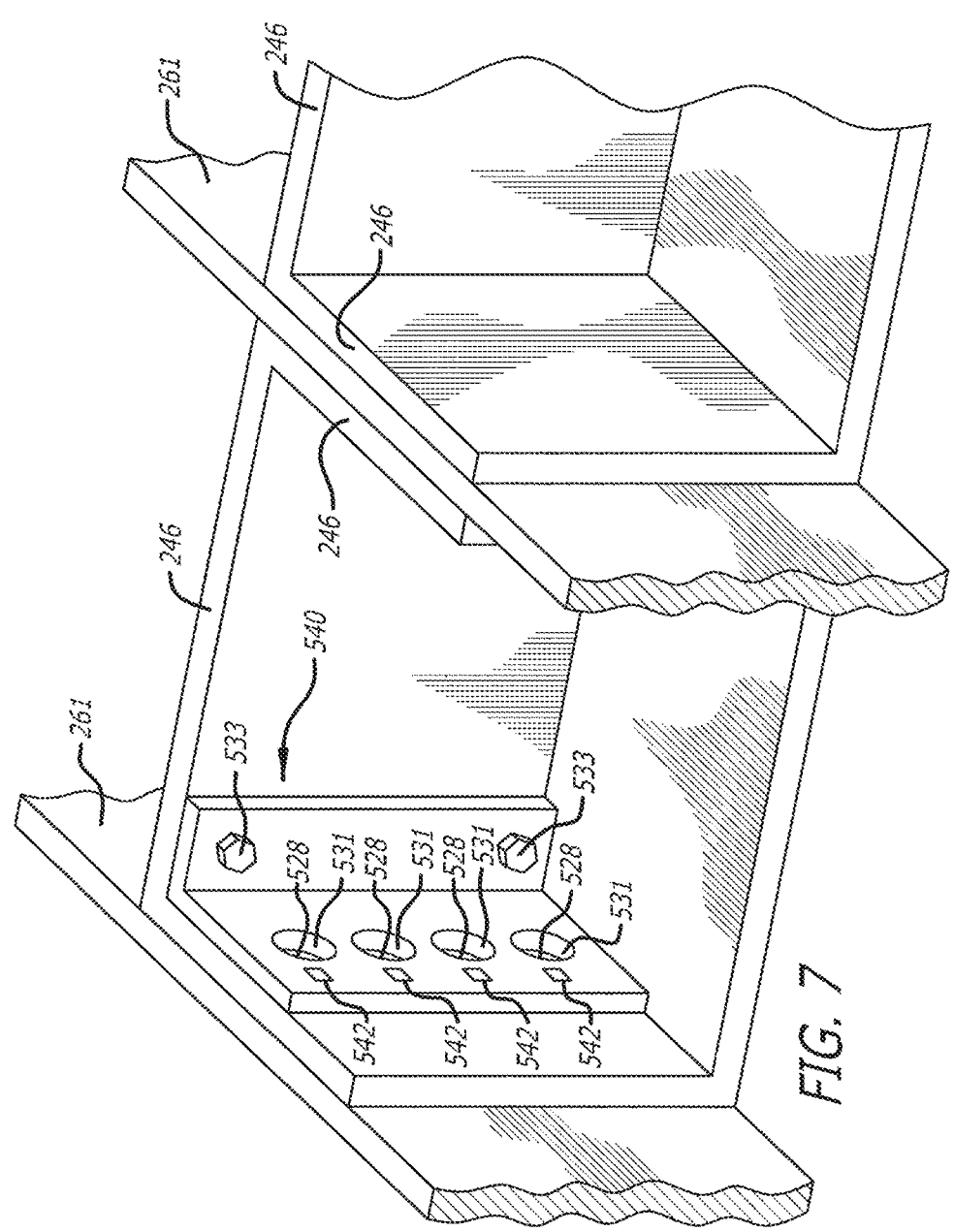

METHODS FOR PROCESSING A WORKPIECE

CROSS-REFERENCE TO RELATED APPLICATIONS

This application is a divisional application claiming priority to U.S. application Ser. No. 14/174,331, entitled "SYSTEM AND METHOD FOR PROCESSING A WORKPIECE" filed on Feb. 6, 2014, which claims the benefit of U.S. Provisional Application No. 61/931,819, filed Jan. 27, 2014, both of which are incorporated herein by reference in their entirety for all purposes.

BACKGROUND

Assembly of components of a workpiece to be joined by generally manual methods, such as by bolting with threaded fasteners, can be difficult if the work environment is located beyond the manual reach of a worker. In particular, where a number of fasteners are to be installed at an angle to the line of sight, drilling the holes for the fasteners and torquing the fasteners may be challenging. In addition, as the number of fasteners to be installed increases, keeping track of which work locations have been drilled, which drilled holes have been inspected, and which installed fasteners have been torqued becomes more difficult.

SUMMARY

Accordingly, a system and method, intended to address the above-identified concerns, would find utility.

One example of the present disclosure relates to a system for processing a workpiece. The system includes a rotary drive having a path along which a flow of a fluid is established during operation thereof. The rotary drive has a rotational axis, a sensor in communication with the path, wherein the sensor generates a signal responsive to the flow of the fluid and does not generate the signal responsive to an absence of the flow of the fluid, the signal having a duration interval, and a controller communicatively coupled to the sensor. The controller is configured to enable the operation of the rotary drive subsequent to a termination of the signal if the duration interval of the signal is greater than or equal to a predetermined value, and to prevent the operation of the rotary drive subsequent to the termination of the signal if the duration interval of the signal is less than the predetermined value.

Another example of the present disclosure relates to a method of processing a workpiece. The method includes identifying processing locations on the workpiece; drilling a first hole at one of the processing locations using a rotary drive; sensing a flow of a fluid associated with operating the rotary drive while drilling the first hole; generating an operation signal responsive to the flow and not generating the operation signal responsive to an absence of the flow; comparing a duration interval of the operation signal to a predetermined temporal value; and drilling a different hole at a different one of the processing locations if the duration interval of the operation signal is greater than or equal to the predetermined temporal value and not drilling the different hole if the duration interval is less than the predetermined temporal value.

BRIEF DESCRIPTION OF THE DRAWINGS

Figure 1:
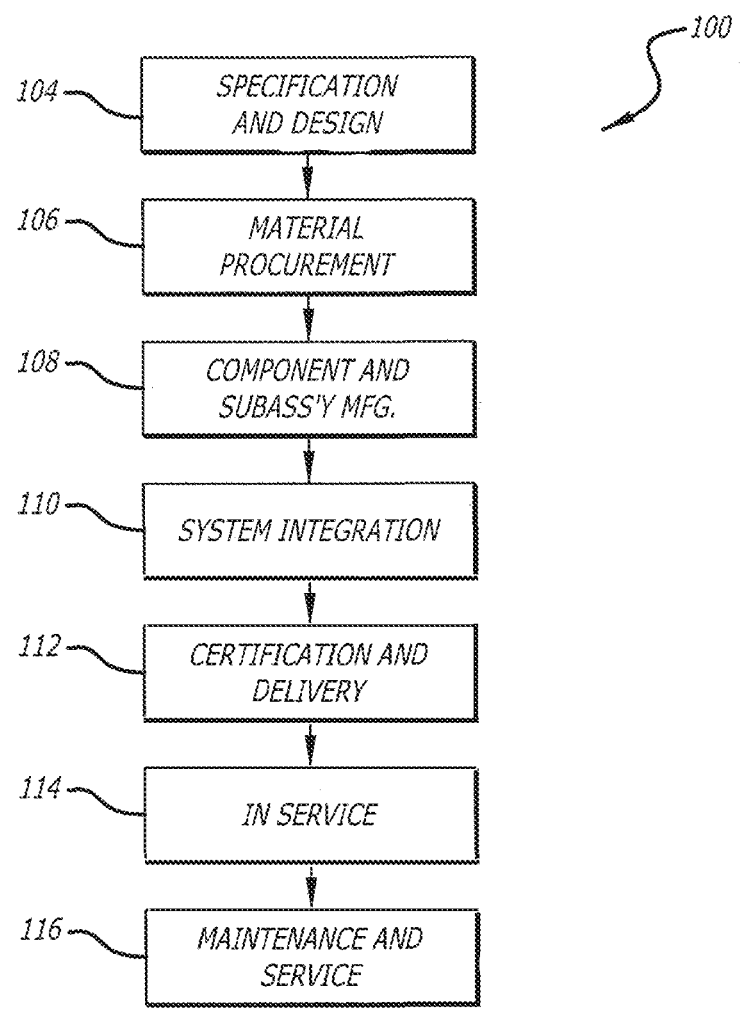
Figure 2:
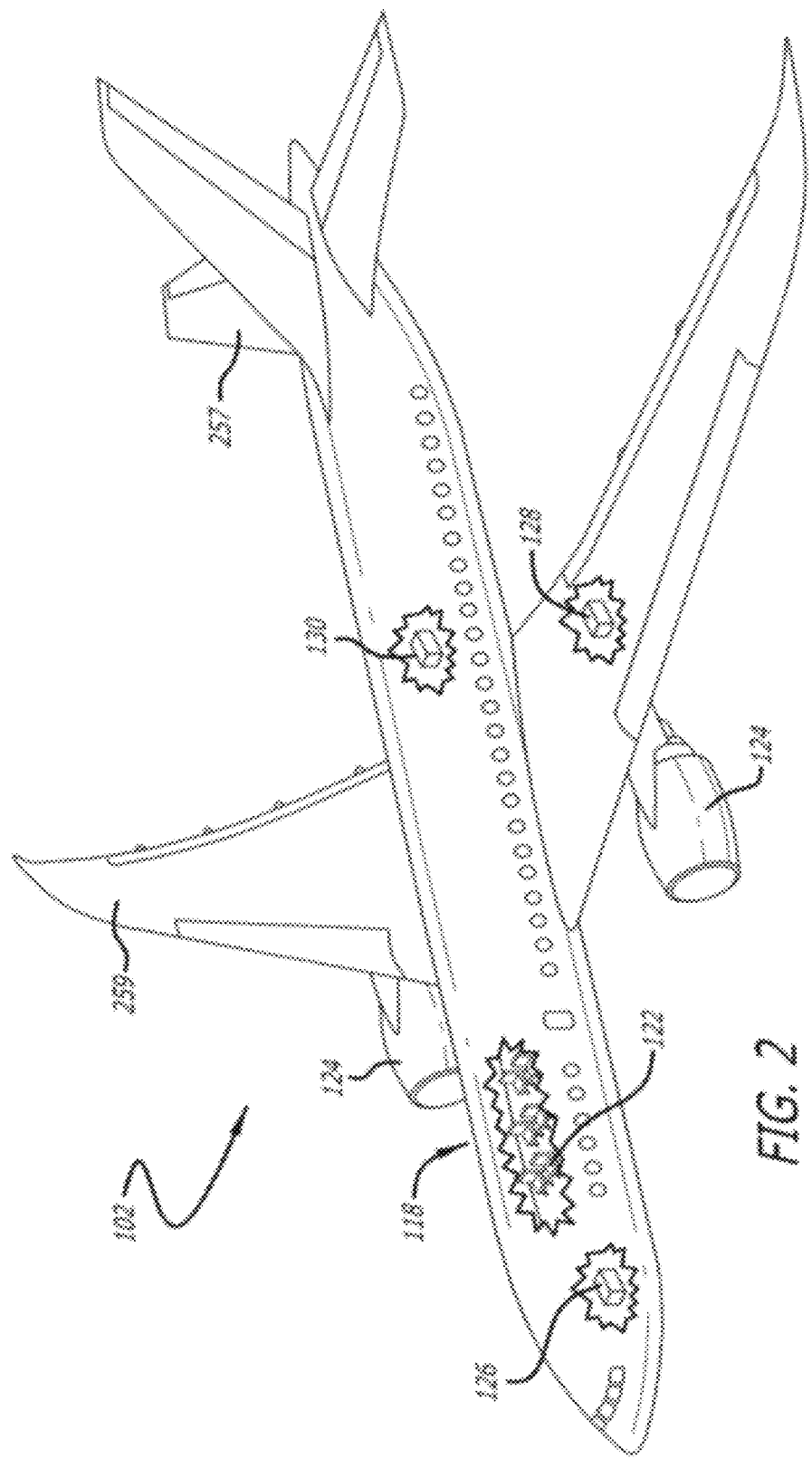
Figure 3:
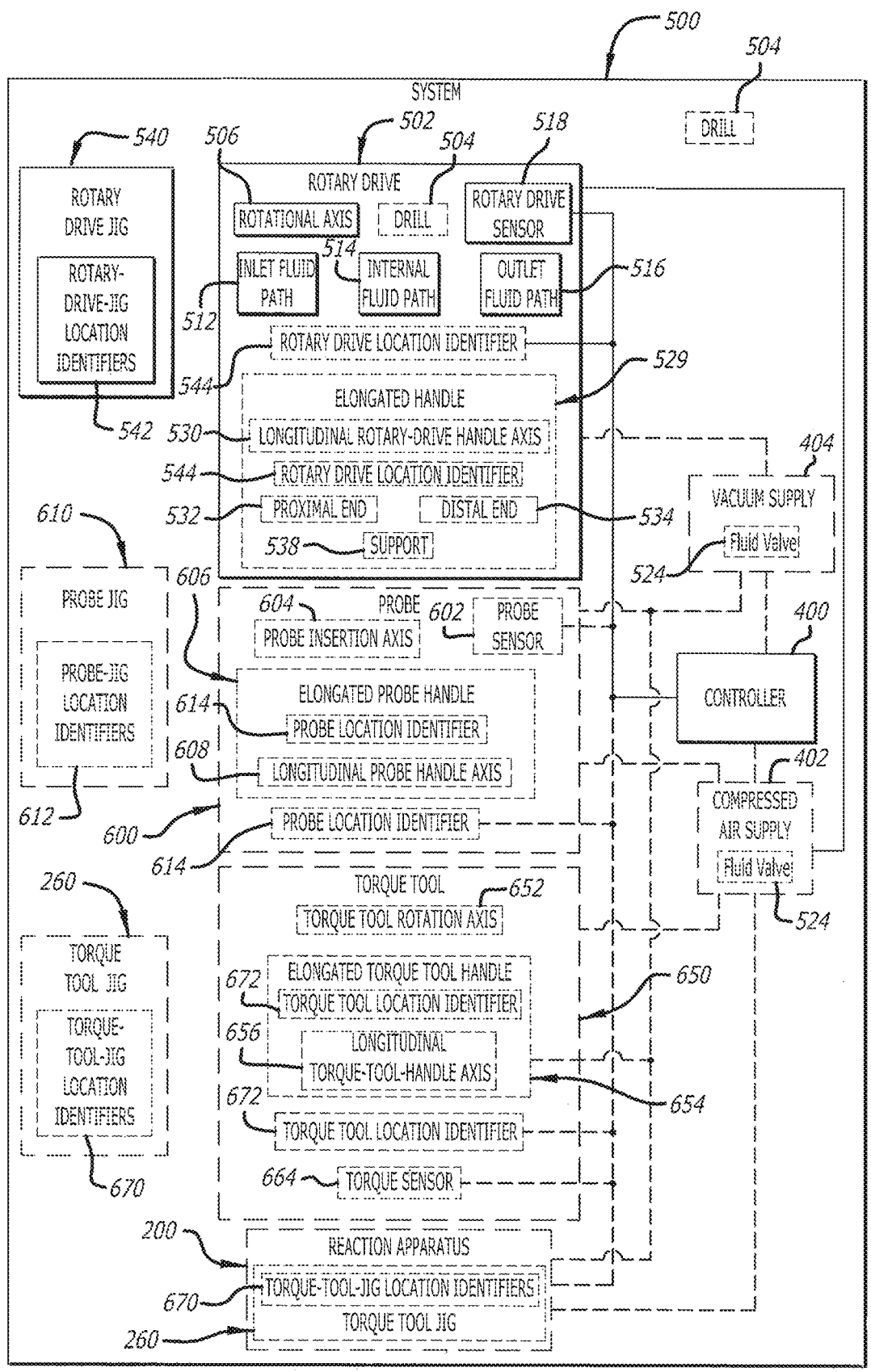
Figure 4:
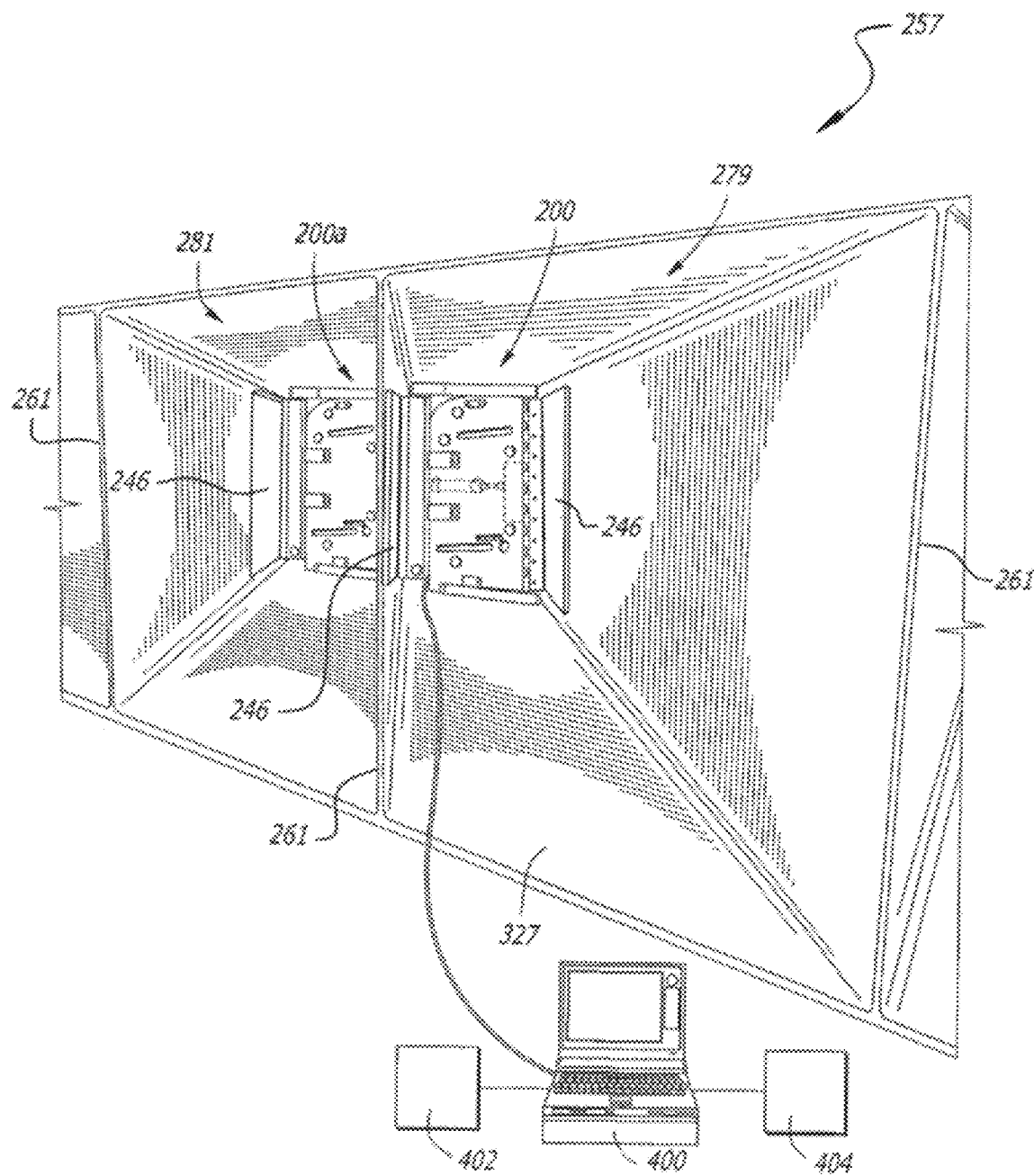
Figure 5:
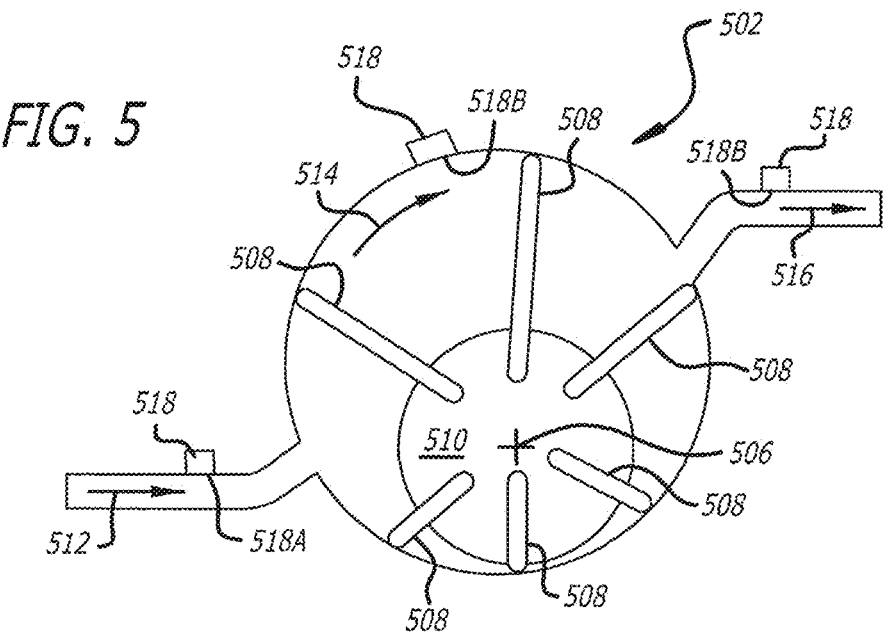
Figure 6:
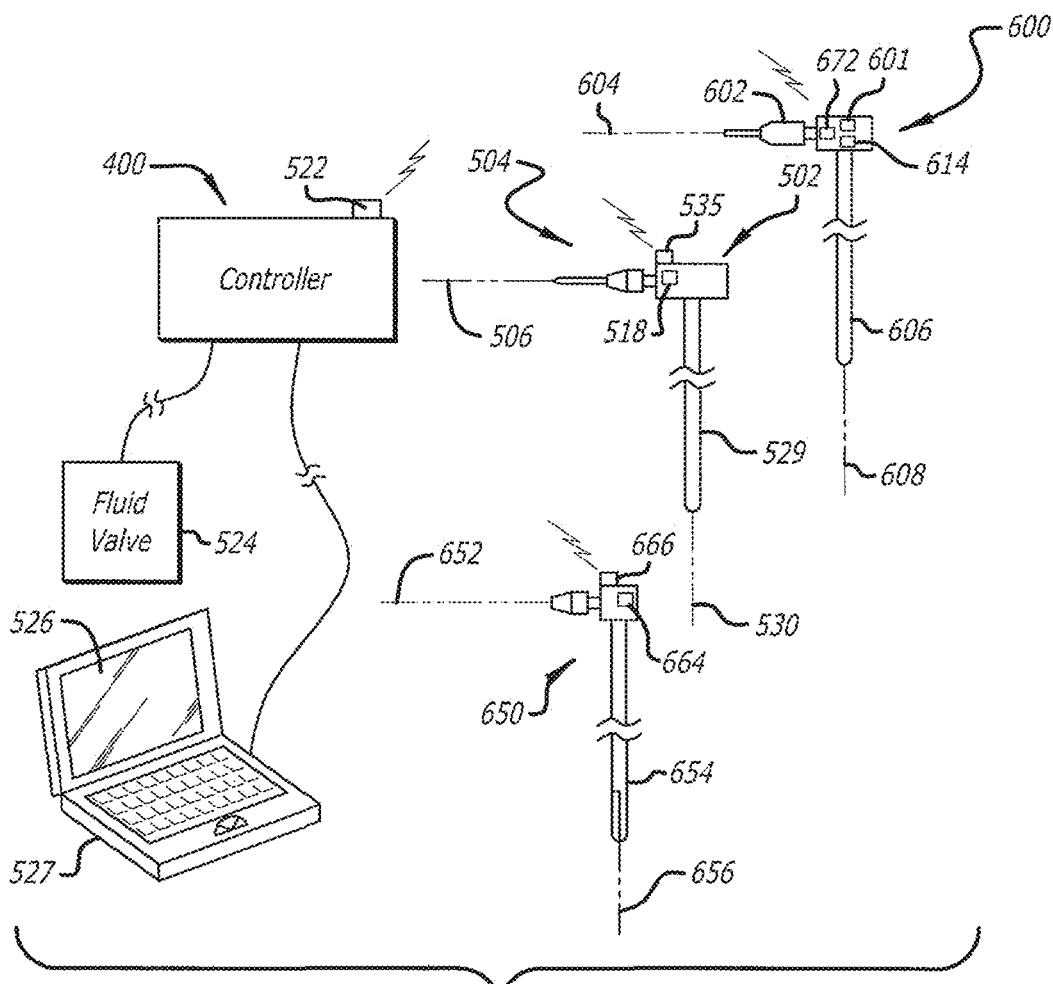
Figure 9:
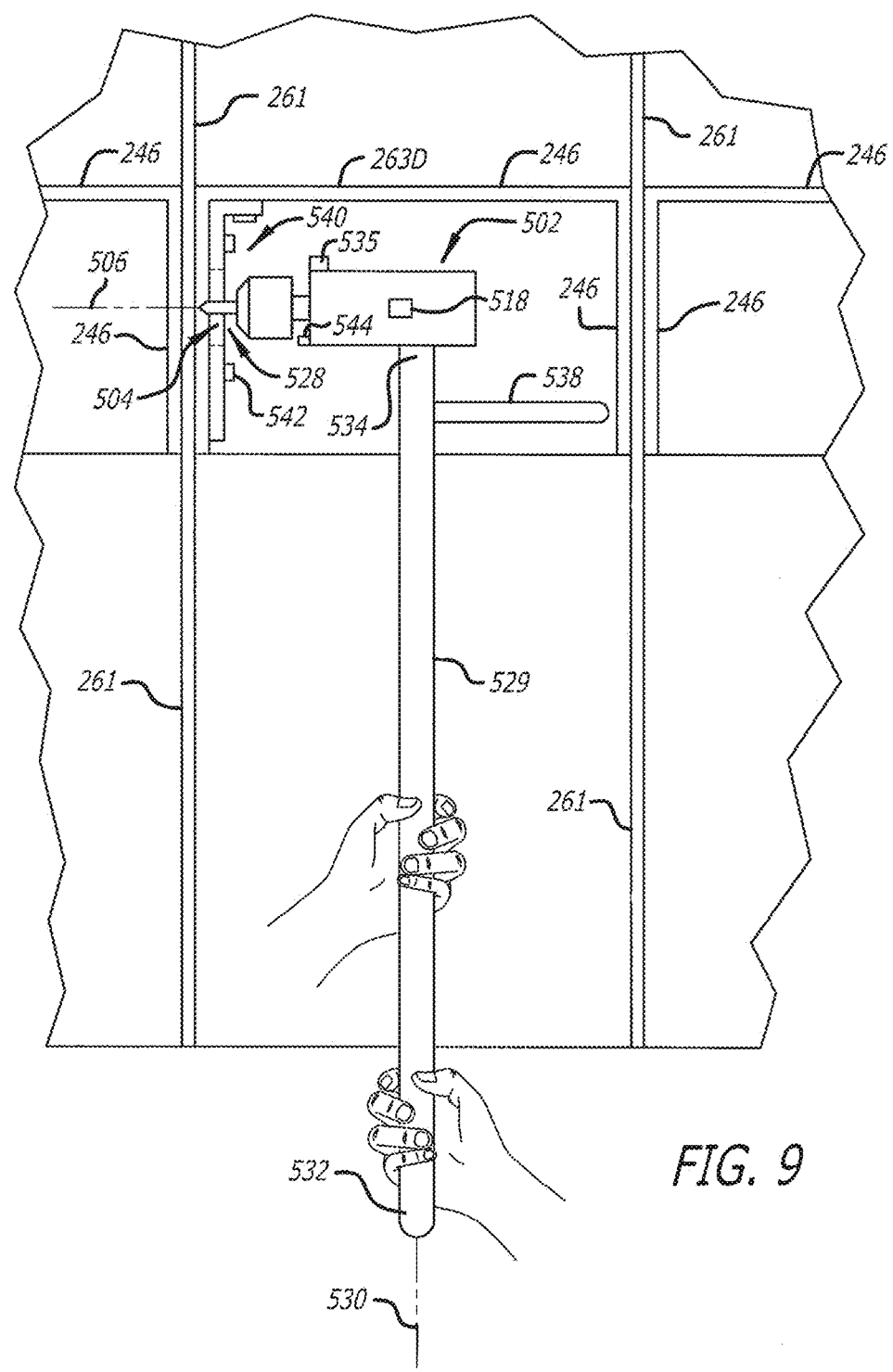
Figure 10:
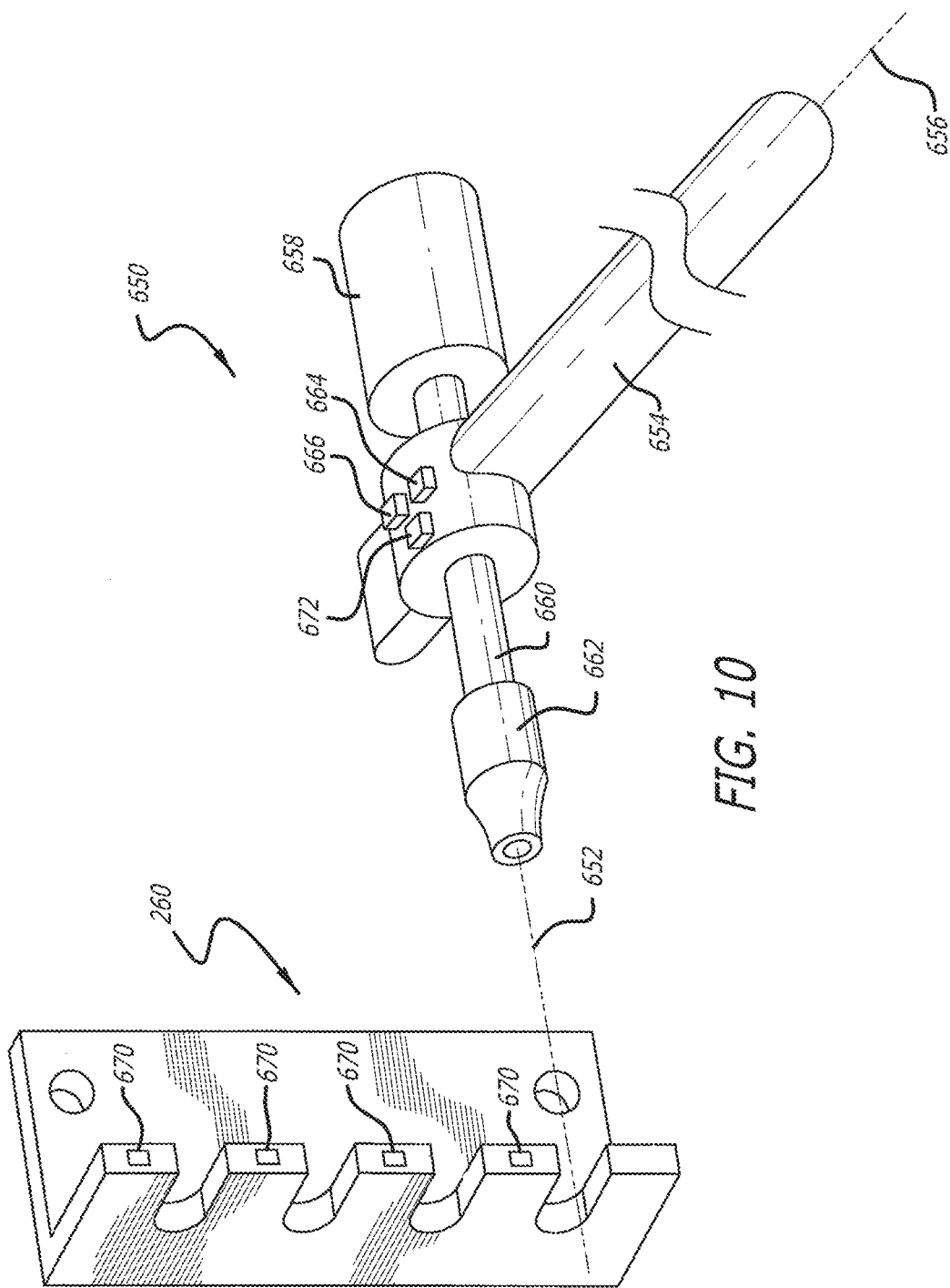
Figure 11:
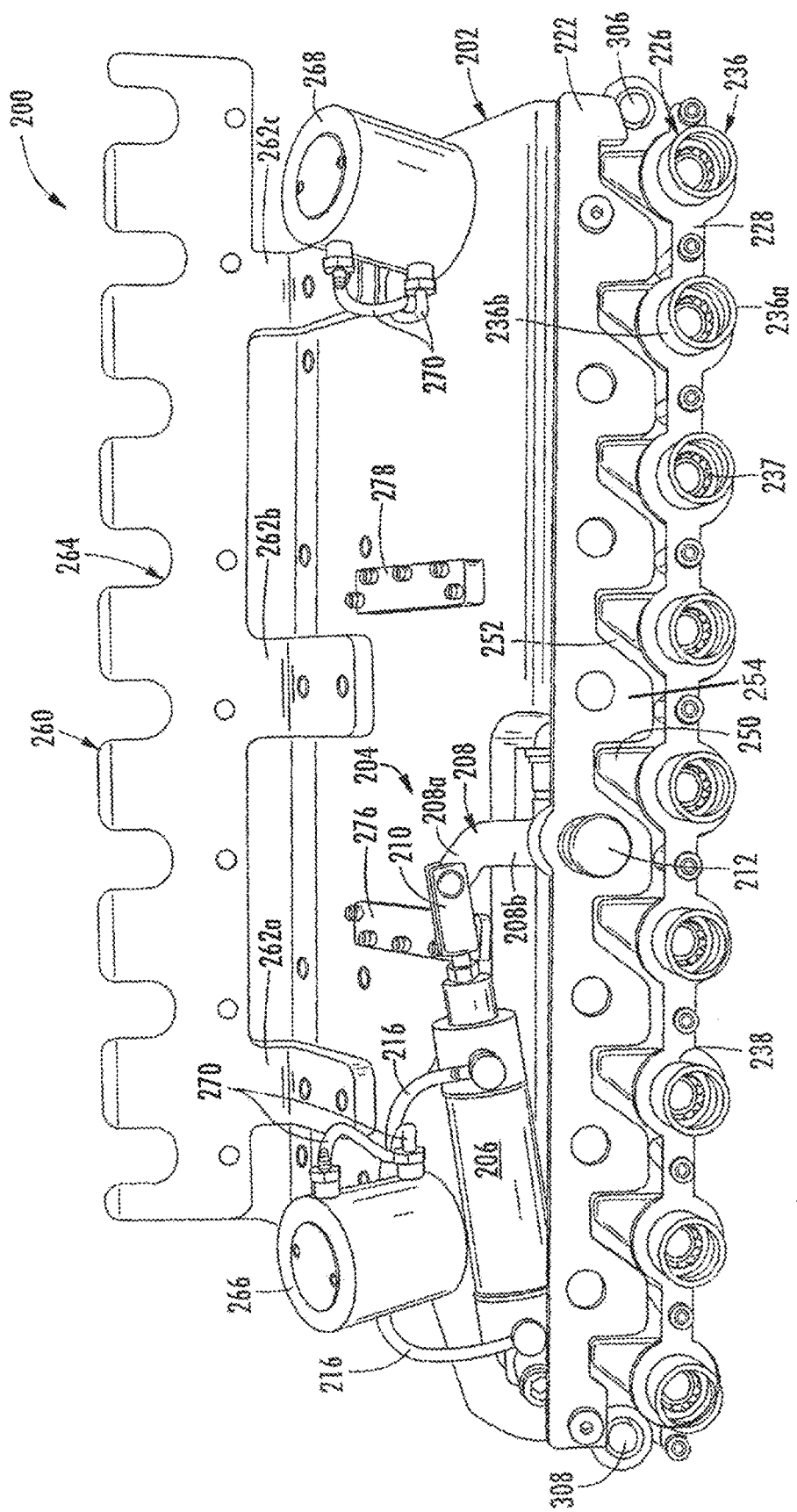
Figure 12:
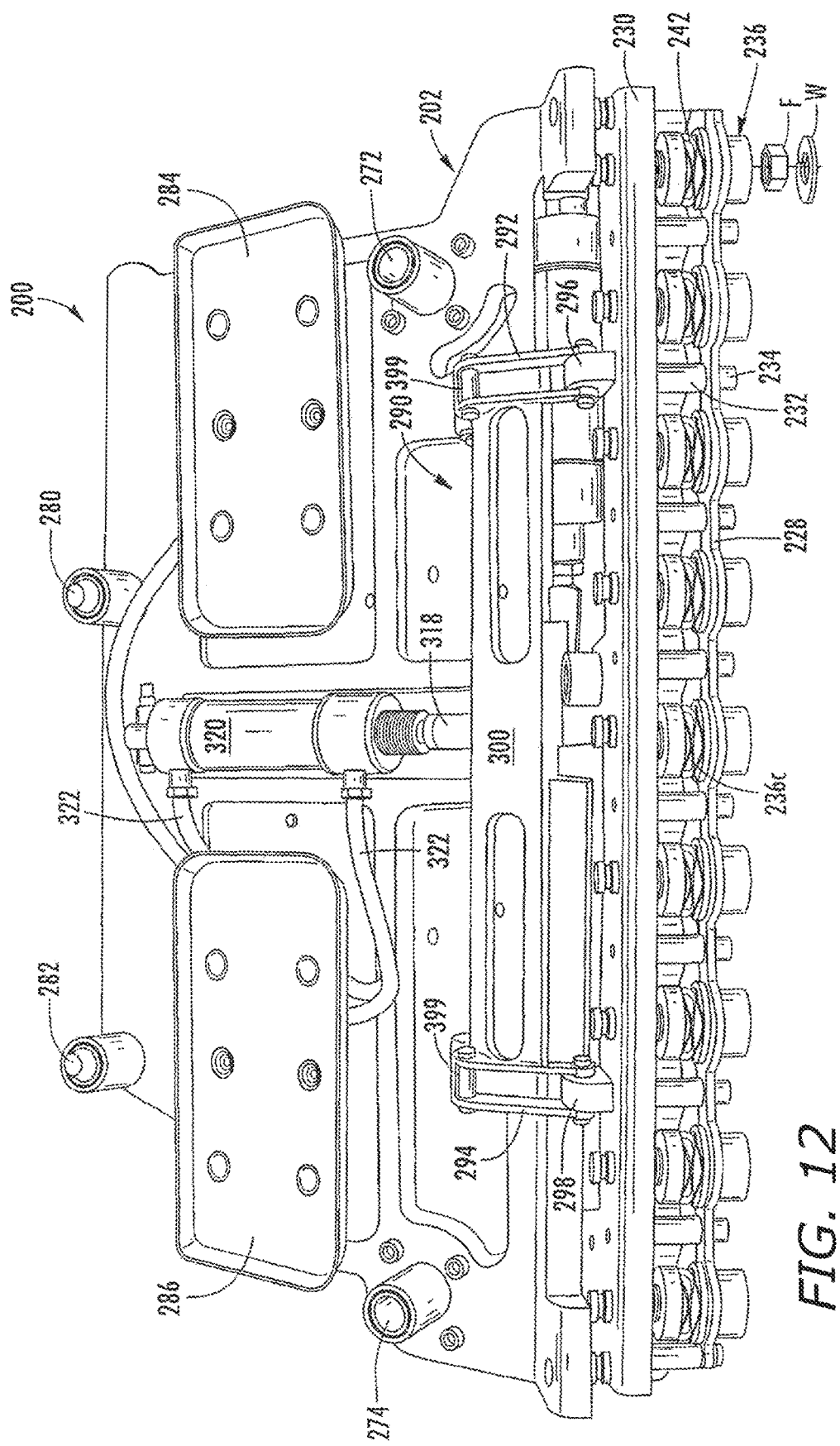
Figure 13:
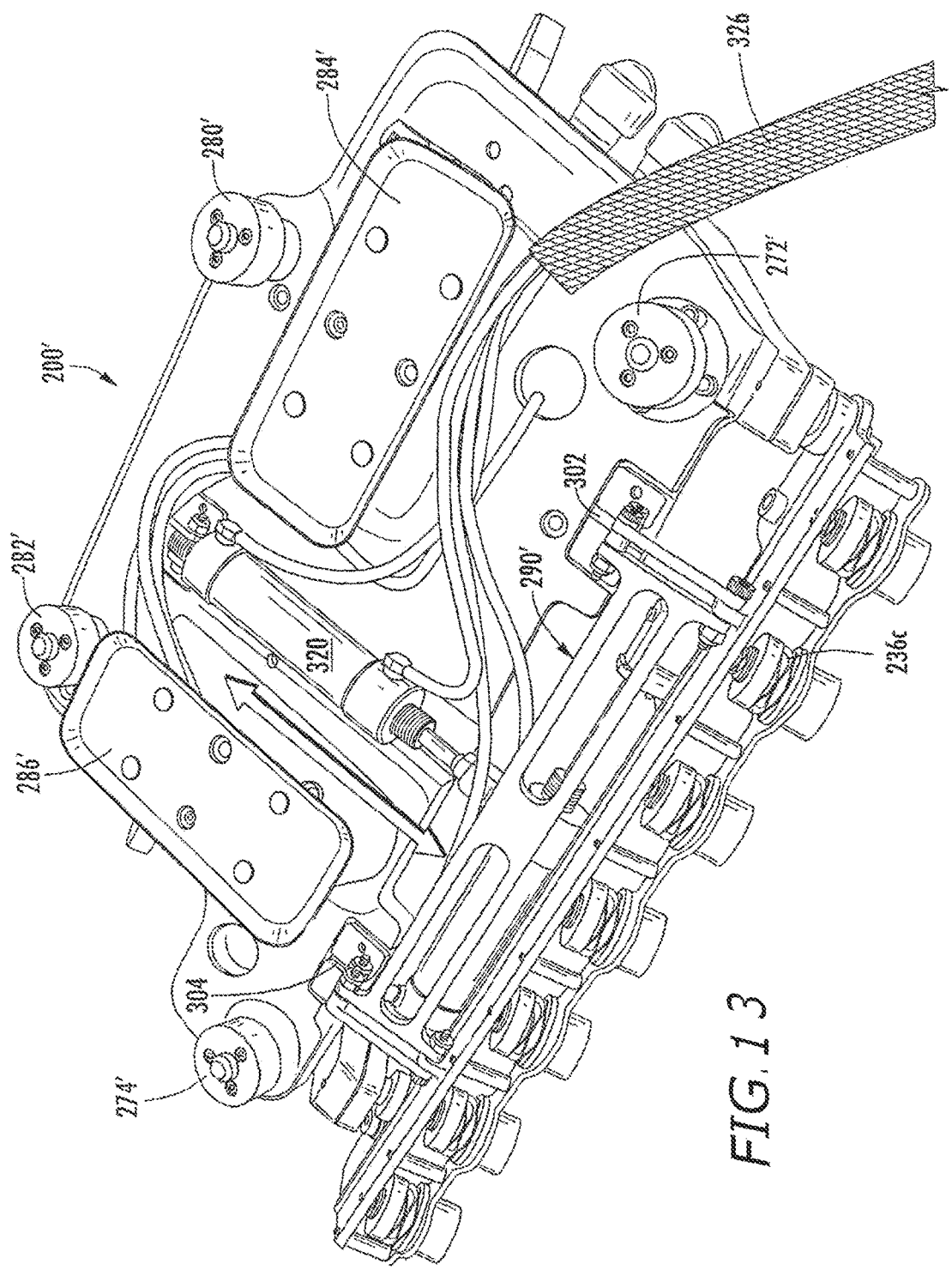
Figure 14:
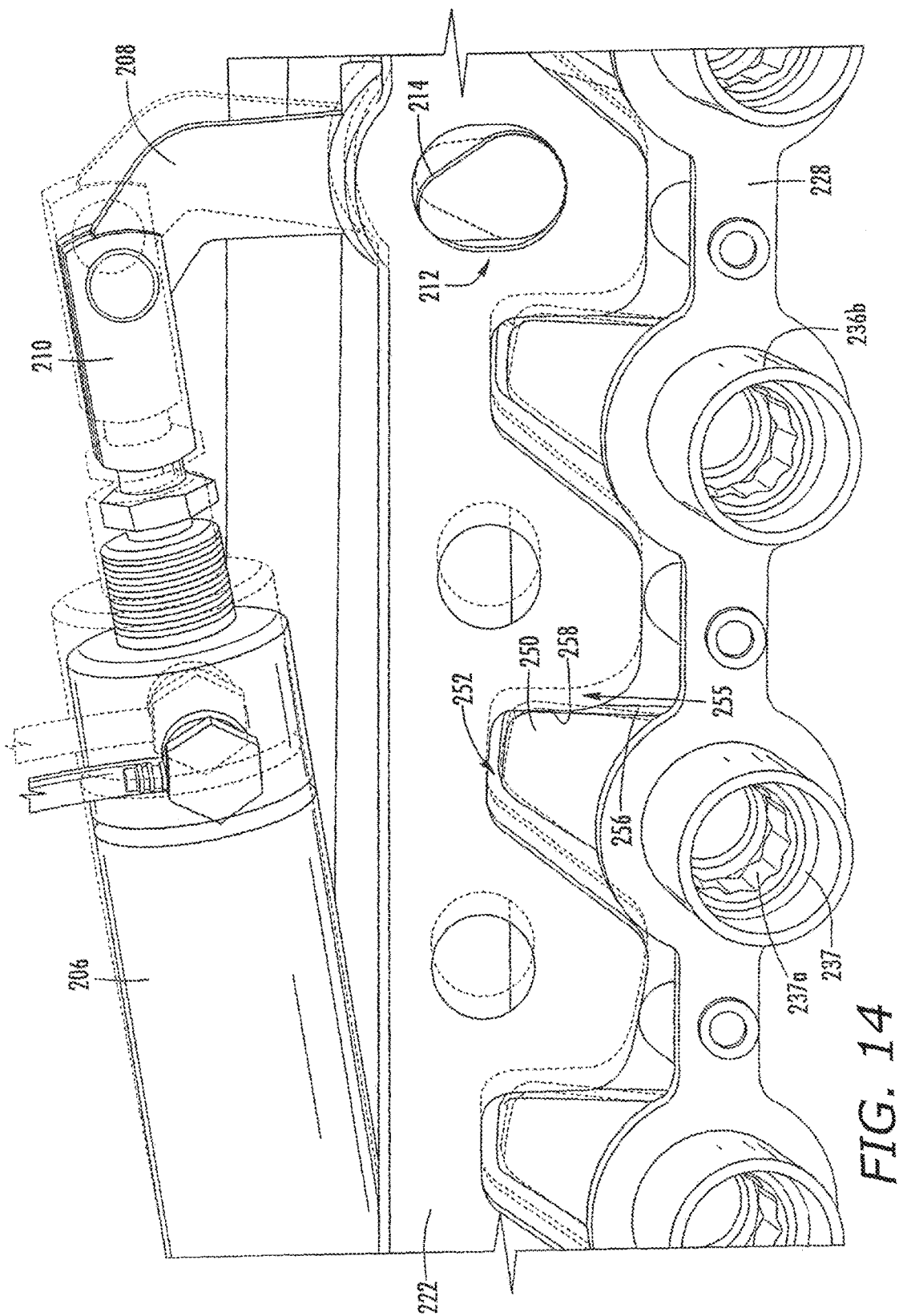
Figure 15:
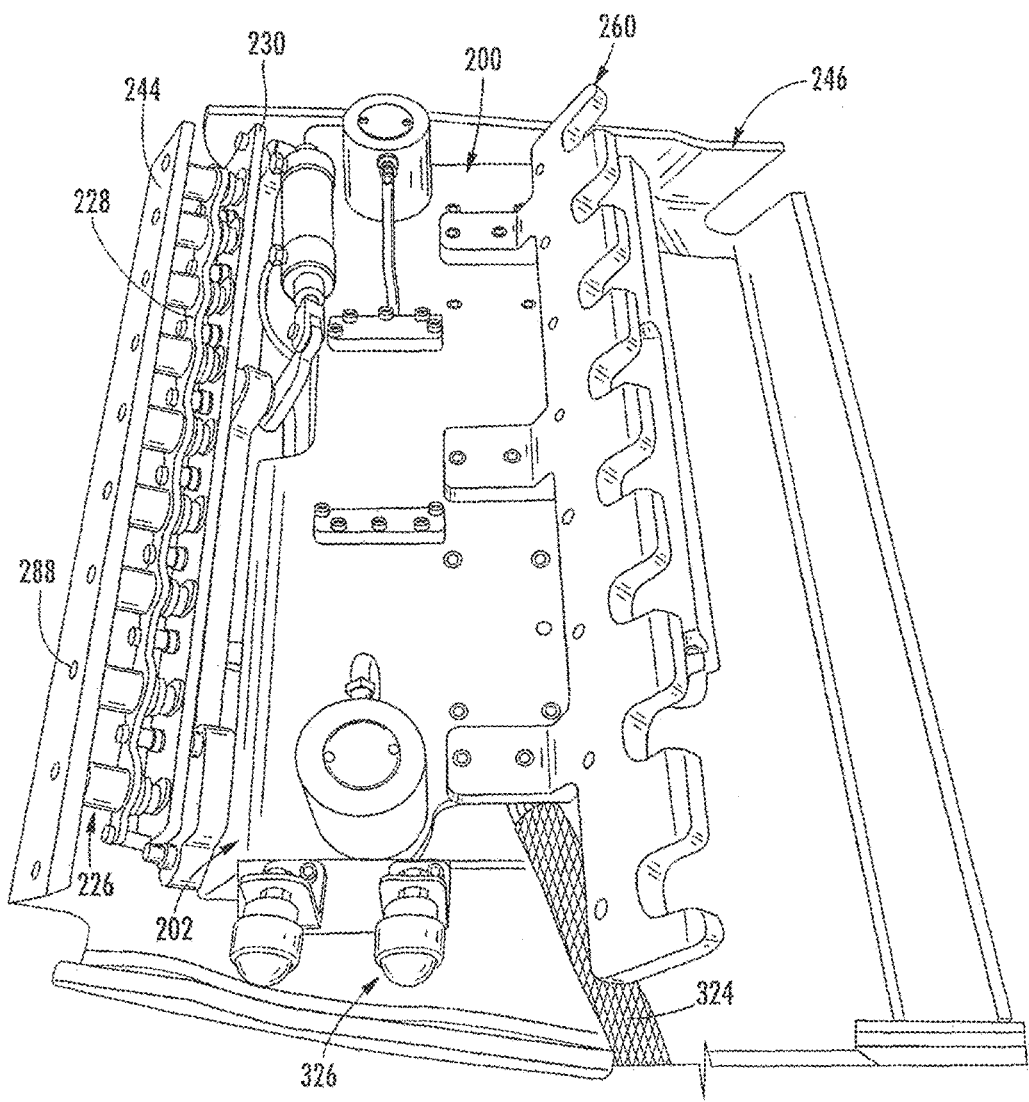
Figure 16A:
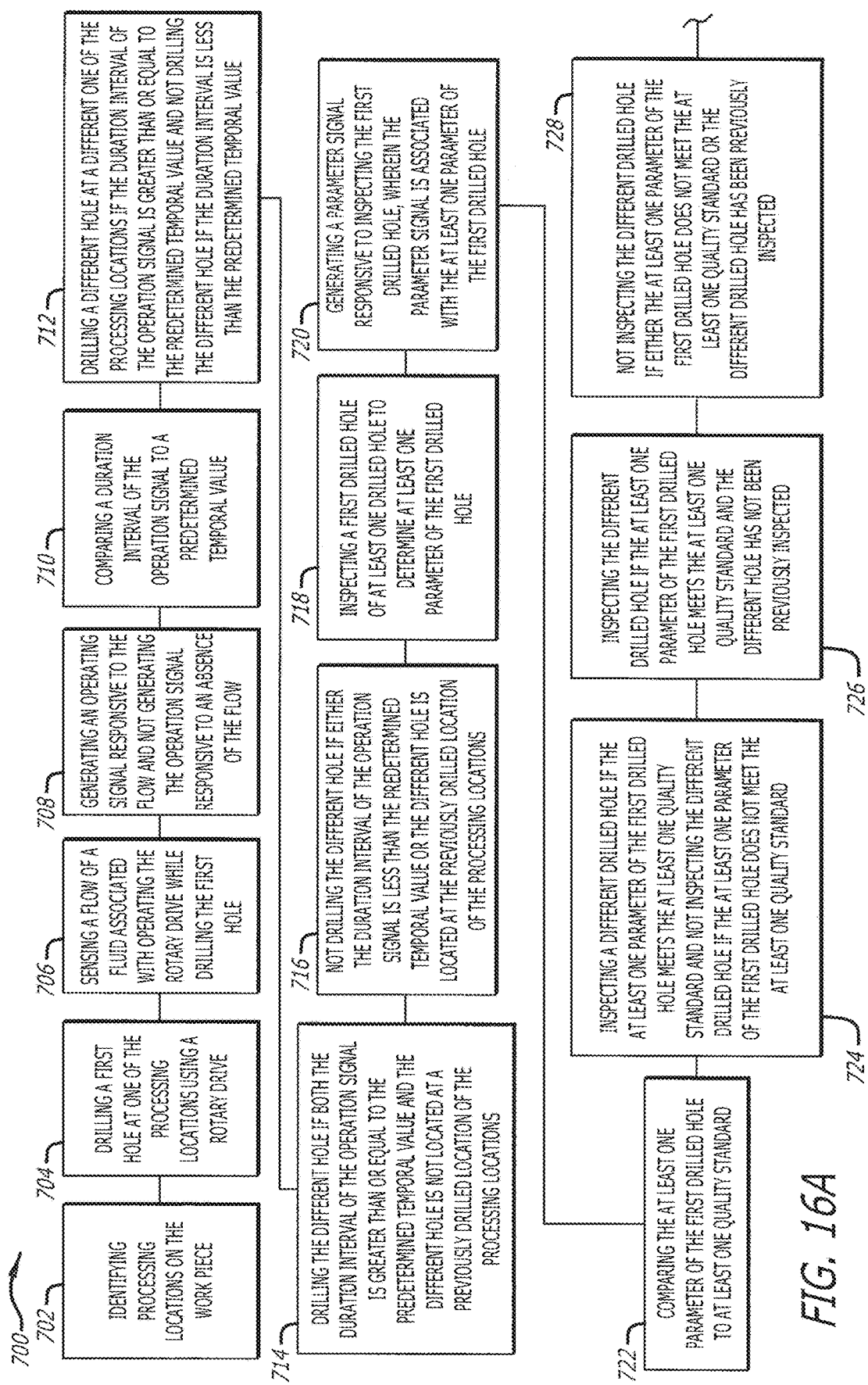
Figure 16B:
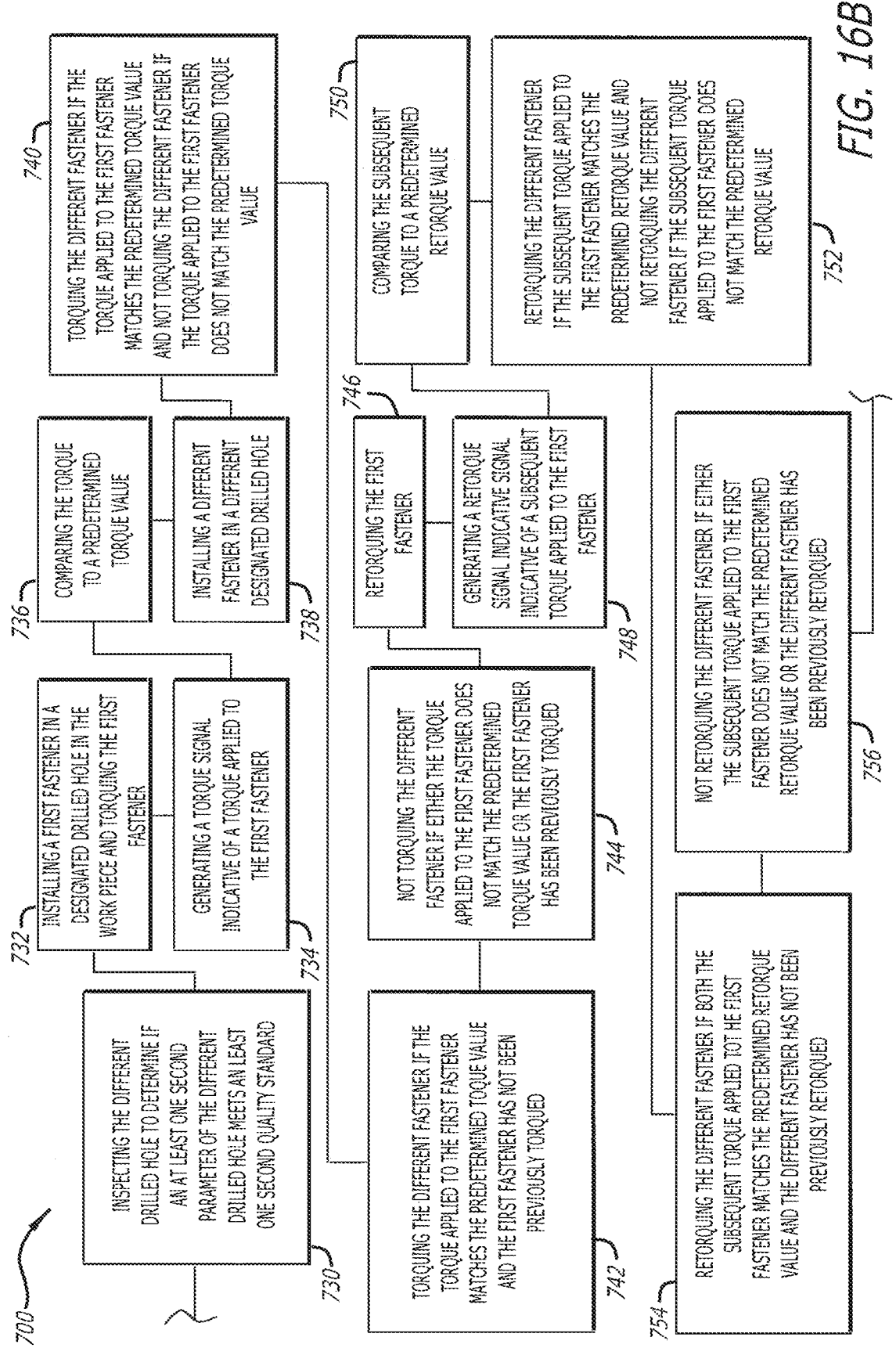
Figure 16C:
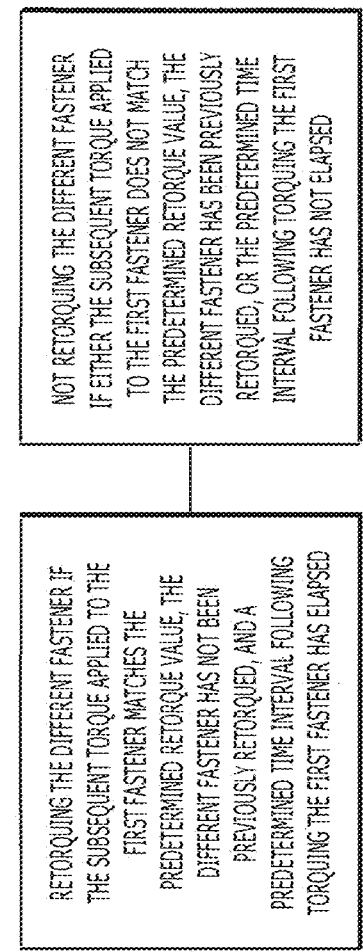

Having thus described examples of the disclosure in general terms, reference will now be made to the accompanying drawings, which are not necessarily drawn to scale, and wherein like reference characters designate the same or similar parts throughout the several views, and wherein:

FIG. 1 is a flow diagram of aircraft production and service methodology;

FIG. 2 is a schematic illustration of an aircraft;

FIG. 3 is a block diagram of a system for processing a workpiece, according to one aspect of the present disclosure;

FIG. 4 is a schematic perspective view into a wing structure of the aircraft of FIG. 2, illustrating a reaction apparatus which may form a part of the system shown in FIG. 3, according to one aspect of the disclosure;

FIG. 5 is a schematic view of a rotary drive of the system of FIG. 3, according to one aspect of the disclosure;

FIG. 6 is a schematic view of components of the system of FIG. 3, according to one aspect of the disclosure;

FIG. 7 is a schematic perspective view of the wing structure shown in FIG. 4;

FIG. 8 is a schematic perspective view of a jig usable with one of the components of FIG. 3;

FIG. 9 is a schematic top plan cut-away view of the wing structure of FIG. 7, illustrating a tool component of the system of FIG. 3, according to one aspect of the disclosure;

FIG. 10 is a schematic perspective view of a torque tool and the torque-tool jig of the system of FIG. 3, according to one aspect of the disclosure;

FIG. 11 is a schematic perspective view of the reaction apparatus shown in FIG. 4, according to one aspect of the disclosure;

FIG. 12 is a schematic view of the opposite side of the reaction apparatus of FIG. 11;

FIG. 13 is a schematic view of an alternative example of the reaction apparatus of FIG. 11, according to one aspect of the disclosure;

FIG. 14 is a detail view of the reaction apparatus of FIG. 11, according to one aspect of the disclosure;

FIG. 15 is an environmental perspective view of the reaction apparatus of FIG. 11, according to one aspect of the disclosure; and FIGS. 16A, 16B, and 16C are each a portion of a block diagram illustrating a method of processing a workpiece, according to one aspect of the present disclosure.

In the block diagram of FIG. 3, referred to above, solid lines connecting various elements and/or components may represent mechanical, electrical, fluid, optical, electromagnetic and other couplings and/or combinations thereof. As used herein, "coupled" means associated directly as well as indirectly. For example, a member A may be directly associated with a member B, or may be indirectly associated therewith, e.g., via another member C. Couplings other than those depicted in the block diagrams may also exist. Dashed lines, if any, connecting the various elements and/or components represent couplings similar in function and purpose to those represented by solid lines; however, couplings represented by the dashed lines are either selectively provided or relate to alternative or optional aspects of the disclosure. Likewise, any elements and/or components, represented with dashed lines, indicate alternative or optional aspects of the disclosure. Environmental elements, if any, are represented with dotted lines.

DETAILED DESCRIPTION

In the following description, numerous specific details are set forth to provide a thorough understanding of the disclosed concepts, which may be practiced without some or all of these particulars. In other instances, details of known devices and/or processes have been omitted to avoid unnecessarily obscuring the disclosure. While some concepts will be described in conjunction with specific examples, it will be understood that these examples are not intended to be limiting.

Reference in the specification to "one example" or "one aspect" means that one or more feature, structure, or characteristic described in connection with the example or aspect is included in at least one implementation. The phrase "one example" or "one aspect" in various places in the specification may or may not be referring to the same example or aspect.

Examples of the disclosure may be described in the context of an aircraft manufacturing and service method 100, as shown in FIG. 1, and an aircraft 102, as shown in FIG. 2. During pre-production, illustrative method 100 may include specification and design 104 of the aircraft 102 and material procurement 106. During production, component and subassembly manufacturing 108 and system integration 110 of the aircraft 102 take place. Thereafter, the aircraft 102 may go through certification and delivery 112 to be placed in service 114. While in service by a customer, the aircraft 102 is scheduled for routine maintenance and service 116 (which may also include modification, reconfiguration, refurbishment, etc.).

Each of the processes of the illustrative method 100 may be performed or carried out by a system integrator, a third party, and/or an operator (e.g., a customer). For the purposes of this description, a system integrator may include, without limitation, any number of aircraft manufacturers and major-system subcontractors; a third party may include, without limitation, any number of vendors, subcontractors, and suppliers; and an operator may be an airline, leasing company, military entity, service organization, and so on.

As shown in FIG. 2, the aircraft 102 produced by the illustrative method 100 may include an airframe 118 with a plurality of high-level systems 120 and an interior 122. Examples of high-level systems 120 include one or more of a propulsion system 124, an electrical system 126, a hydraulic system 128, and an environmental system 130. Any number of other systems may be included. Although an aerospace example is shown, the principles disclosed herein may be applied to other industries, such as the automotive and ship-building industries, among others.

Apparatus and methods shown or described herein may be employed during any one or more of the stages of the manufacturing and service method 100. For example, components or subassemblies corresponding to component and subassembly manufacturing 108 may be fabricated or manufactured in a manner similar to components or subassemblies produced while the aircraft 102 is in service. Also, one or more aspects of the apparatus, method, or combination thereof may be utilized during the production states 108 and 110, for example, by substantially expediting assembly of or reducing the cost of an aircraft 102. Similarly, one or more aspects of the apparatus or method realizations, or a combination thereof, may be utilized, for example and without limitation, while the aircraft 102 is in service, e.g., maintenance and service 116.

As illustrated in FIGS. 3-14, one example of the present disclosure relates to a system 500 (e.g., FIGS. 3 and 6) for processing a workpiece. The system 500 includes a rotary drive 502 (illustrated, e.g., in FIG. 5), having a path along which a flow of a fluid is established during operation thereof. The rotary drive 502 also has a rotational axis 506. A rotary-drive sensor 518 is in communication with the path of the fluid associated with the rotary drive 502. The rotary-drive sensor 518 generates a signal responsive to the flow of the fluid and does not generate the signal responsive to an absence of the flow of the fluid. The signal has a duration interval. As illustrated, e.g., in FIGS. 3 and 6, the system 500 also includes a controller 400, communicatively coupled to the rotary-drive sensor 518. The controller 400 is configured to enable the operation of the rotary drive 502 subsequent to a termination of the signal, generated by the rotary-drive sensor 518, if the duration interval of the signal is greater than or equal to a predetermined value, and to prevent the operation of the rotary drive 502 subsequent to the termination of the signal if the duration interval of the signal is less than the predetermined value. In other words, presence of fluid flow established within the rotary drive 502 indicates that the rotary drive 502 is operating. Furthermore, presence of such fluid flow for a predetermined time interval indicates that the tool associated with the rotary drive 502 has successfully completed the required operation.

As illustrated, e.g., in FIG. 5, in one aspect of the disclosure, which may include at least a portion of the subject matter of any of the preceding and/or following examples and aspects, the path along which the flow of the fluid is established during operation of the rotary drive 502 is an inlet fluid path 512 of the rotary drive 502. In one aspect of the disclosure, which may include at least a portion of the subject matter of any of the preceding and/or following examples and aspects, the path is an internal fluid path 514 of the rotary drive 502. In one aspect of the disclosure, which may include at least a portion of the subject matter of any of the preceding and/or following examples and aspects, the path is an outlet fluid path 516 of the rotary drive 502.

The workpiece described herein may be an assembly including a plurality of rib structures 246 (FIG. 4) installed within rib bays (e.g., rib bays 279 and 281) of an associated horizontal stabilizer 257 (illustrated, e.g., in FIGS. 2 and 4) of the aircraft 102 (FIG. 2). As used herein, the workpiece may also be a wing structure, such as a wing 259 of the aircraft 102 or yet another structure, not necessarily associated with an aircraft.

The rotary drive 502, shown, e.g., in FIG. 9, is a motor for operating a tool, such as a drill 504, used in processing the workpiece. Alternatively, the rotary drive 502 may include the drill 504. As used herein, a drill is a tool for holding and operating a cutting bit. In the example of FIG. 5, the rotary drive 502 is a fluid-driven rotary vane motor having vanes 508, projecting radially from a rotor 510. Motive pressurized fluid, such as compressed air, flows along the path. A suitable compressed-air supply (e.g., a compressed-air supply 402, shown schematically in FIGS. 3 and 4) may be provided to operate the rotary drive 502, as well as other components of the system 500 which utilize pressurized fluid, as will be described hereinafter. The compressed-air supply 402 may be supplemented or replaced by a vacuum supply 404 (FIG. 4). For example, components of the system 500 may be advanced by compressed air and retracted by vacuum, or vice versa. Where both elevated pressure and vacuum are employed, a fluid valve 524 (illustrated in FIGS. 3 and 4) may control one or both of the elevated pressure and vacuum portions of the system 500.

FIG. 5 shows an inlet portion or the inlet fluid path 512 of the rotary drive 520, an internal portion or the internal fluid path 514 of the rotary drive 502, and an outlet portion, or the outlet fluid path 516 of the rotary drive 502. The fluid moving along the inlet fluid path 512, the internal fluid path 514, and the outlet fluid path 516 may have functions in addition to or in lieu of providing power. For example, the fluid could be a coolant or a lubricant, may play a role in cleaning or clearing the rotary drive of contaminants and debris, or may perform still other functions, or any combination of the previously recited functions. The internal fluid path 514 is, in the example of FIG. 5, an expansion chamber of the rotary vane motor. As illustrated in FIG. 5, the rotary-drive sensor 518 may be positioned at locations 518A, 518B, and/or 518C relative to the rotary drive 502. In another example, the rotary drive 502 may be an electrically powered motor where the fluid flowing therethrough serves a cooling function.

In one aspect of the disclosure, which may include at least a portion of the subject matter of any of the preceding and/or following examples and aspects, the rotary-drive sensor 518, shown in FIG. 5, is a flow sensor, such as a paddle or paddle-wheel type flow sensor, for example. In one aspect of the disclosure, which may include at least a portion of the subject matter of any of the preceding and/or following examples and aspects, the rotary-drive sensor 518 may be a pressure sensor, such as a diaphragm-type pressure sensor. Although three sensor locations 518A, 518B, 518C are depicted in FIG. 5, only one sensor location 518A, 518B, or 518C for the rotary-drive sensor 518 is required. The rotary-drive sensor 518 includes a signal transmitter 535 (shown as a separate component in the example of FIG. 6), which maybe a low-power wireless device, for example. Continuing to refer to FIG. 6, the rotary-drive sensor 518 communicates with the controller 400. The controller 400 may also communicate with the fluid-control valve 524. The valve 524 may be associated with the compressed-air supply 402, the vacuum supply 404, or their supply conduits that deliver pressurized fluid and/or vacuum from the compressed-air supply 402 and/or the vacuum supply 404, respectively, to the rotary drive 502. The controller 400 may include a display screen 526. The fluid-control valve 524 may enable fully automatic control of the rotary drive 502 via the controller 400. Alternatively, advisory messages presented on the display screen 526 may allow a human operator to monitor operation of the system 500. An input device 527, such as a keyboard, communicatively coupled to the controller 522, may be utilized by the operator for inputting operating parameters of the system 500. The controller 400 includes a data processing device, a memory, and software for processing signals from tools, such as the rotary drive 502, and other components to be described hereinafter.

In one aspect of the disclosure, which may include at least a portion of the subject matter of any of the preceding and/or following examples and aspects, and referring particularly to FIGS. 7 and 8, the system 500, schematically illustrated in FIG. 3, also includes an elongated rotary-drive handle 529 (shown, e.g., in FIG. 9) having a longitudinal rotary-drive handle axis 530, wherein the rotational axis 506 of the rotary drive 502 is substantially perpendicular to the longitudinal rotary-drive handle axis 530, with the rotary drive 502 coupled to the elongated rotary-drive handle 529.

The workpiece to be processed using the system 500 and illustrated, e.g., in FIG. 7, may comprise vertical spars 261 and rib structures 246. The rib structures 246 require attachment to the vertical spars 261 for bracing of the final assembly. In one example, two adjacent rib structures 246 may sandwich one vertical spar 261 therebetween.

Referring once again to FIG. 9, drilling of the rib structures 246 and the vertical spars 261 is performed using the rotary drive 502, coupled to the elongated rotary-drive handle 529. The term "elongated handle", as used herein, means that the handle is long enough to position its associated support item, such as the rotary drive 502, beyond the reach of an extended arm of the operator. The elongated rotary-drive handle 529 facilitates drilling operations within a bay, such as the rib bay 279 (FIG. 4).

As illustrated, e.g., in FIG. 9, in one aspect of the disclosure, which may include at least a portion of the subject matter of any of the preceding and/or following examples and aspects, the elongated rotary-drive handle 529 includes a proximal end 532, a distal end 534, and may include a support 538 therebetween. The support 538 is configured to enable the rotary drive 502 to be urged toward a processing location on the workpiece by manipulating the proximal end 532 of the elongated rotary-drive handle 529. The processing location may before example, a predetermined site for a fastener, such as one of the processing locations 528, shown in FIG. 7. In one aspect of the disclosure, which may include at least a portion of the subject matter of any of the preceding and/or following examples and aspects, the support 538 may be a fulcrum for maneuvering the rotary drive 502 into a suitable position relative to the workpiece.

Referring, e.g., to FIG. 7, in one aspect of the disclosure, which may include at least a portion of the subject matter of any of the preceding and/or following examples and aspects, the workpiece includes a plurality of processing locations 528 and the system 500 also includes a rotary-drive jig 540, configured to selectively locate the rotary drive 502 at one of the plurality of processing locations 528. The rotary-drive jig 540 includes geometric features, such as locating openings 531, to ensure that drilling and other work operations are conducted at the predetermined processing locations 528. The rotary-drive jig 540 may be coupled to the workpiece using fasteners, e.g., bolts 533.

To avoid duplication of work operations at any one of the processing location 528 and defects possibly associated with any such duplication as well as to ensure that work operations occur in a prescribed order, if any, in one aspect of the disclosure, which may include at least a portion of the subject matter of any of the preceding and/or following examples and aspects, the system 500 also includes a plurality of rotary-drive-jig location identifiers 542 on the rotary-drive jig 540.

In one aspect of the disclosure, which may include at least a portion of the subject matter of any of the preceding and/or following examples and aspects, the system 500 also includes a rotary-drive location identifier 544 (FIG. 9) on one of the rotary drive 502 and the elongated rotary-drive handle 529. In one aspect of the disclosure, which may include at least a portion of the subject matter of any of the preceding and/or following examples and aspects, each of the rotary-drive-jig location identifiers 542 (FIG. 7) and the rotary-drive location identifier 544 (FIG. 9) includes a radio-frequency identification (RFID) device, such as an RFID reader or an RFID tag. In one aspect, the rotary-drive location identifier 544 may be an RFID reader, also known as an interrogator, and all the rotary-drive jig location identifiers 542 may be RFID tags. Alternatively, the rotary-drive location identifier 544 may be an RFID tag and all the rotary-drive-jig location identifiers 542 may be RFID readers. RFID devices may be passive, active, or battery-assisted passive. Any desired RFID scheme, such as a passive reader with an active tag, an active reader with a passive tag, or an active reader with an active tag, may be utilized. RFID readers incorporate transmitters (e.g., the transmitter 535 of FIG. 6) for transmitting identification signals to a transceiver 522 of the controller 400. The controller 400 utilizes location signals to avoid duplication of work operations and to insure that the work operations are performed in the prescribed order, if any.

Referring to FIG. 6, in one aspect of the disclosure, which may include at least a portion of the subject matter of any of the preceding and/or following examples and aspects, the system 500 may also include a probe 600, including a probe sensor 602 configured to determine at least one parameter of a hole in the workpiece. The probe 600 has a probe insertion axis 604 and an elongated probe handle 606, having a longitudinal probe-handle axis 608 substantially perpendicular to the probe insertion axis 604 with the probe 600 coupled to the elongated probe handle 606.

The probe 600 provides an inspection function. For example, holes may be inspected to determine quality standards such as hole diameter, hole surface finish, roundness of drilled holes, depth or axial length of holes, perpendicularity of the drilled holes relative to the vertical spars 261(FIG. 9), and presence of burrs or other defects. The probe sensor 602 may be, e.g., a Dimentron Interior Diameter Gauge, manufactured by Mahr GmbH, of Gottingen, Germany.

Referring once again to FIG. 6, in one aspect of the disclosure, which may include at least a portion of the subject matter of any of the preceding and/or following examples and aspects, the probe sensor 602 is communicatively coupled with the controller 400 to transmit signals associated with the at least one parameter of the hole to the controller 400. In one aspect of the disclosure, the controller 502 may terminate work operations if the signals received by the controller 400 from the probe sensor 602 indicate that the at least one parameter of a hole that was just inspected using the probe 600 is out of tolerance.

As illustrated in FIG. 8, in one aspect of the disclosure, which may include at least a portion of the subject matter of any of the preceding and/or following examples and aspects, the system 500 also includes a plurality of probe-jig location identifiers 612 on the probe jig 610, which further includes openings 613 for locating the probe 600. Alternatively, in one aspect, the rotary-drive jig 540 (FIG. 7) may serve as the probe jig 610, in which case the rotary-drive-jig location identifiers 542 may be used as the probe-jig location identifiers 612. In one aspect of the disclosure, which may include at least a portion of the subject matter of any of the preceding and/or following examples and aspects, the system 500 also includes a probe location identifier 614 (FIG. 6) on one of the probe 600 and the elongated probe handle 606.

Referring once again to FIG. 8, the probe-jig location identifiers 612 in conjunction with the probe location identifier 614 collectively ensure that the probe 600 is located at an appropriate one of the processing locations 528. As stated previously, the rotary-drive jig 540 may also serve as the probe jig in some examples.

In one aspect of the disclosure, which may include at least a portion of the subject matter of any of the preceding and/or following examples and aspects, the probe-jig location identifiers 612 (FIG. 8) and the probe-location identifier 614 (FIG. 6) may each include an RFID device. The RFID devices associated with the probe 600 and the probe jig 610 may be the structural and functional equivalents of the RFID devices of the rotary drive 502 and the rotary-drive jig 540. A transmitter 601 (shown as a device separate from the probe-location identifier 614 in FIG. 6), may be used to transmit signals indicative of the location of the probe 600 relative to the workpiece to the controller 400.

The probe 600 may utilize the compressed-air supply 402 (and/or the vacuum supply 404) for advancing the probe sensor 602 into and retracting the probe sensor 602 from a drilled hole. Alternatively, positioning of the probe sensor 602 may be performed using mechanical or electromechanical actuators.

Referring primarily to FIGS. 6 and 10, in one aspect of the disclosure, which may include at least a portion of the subject matter of any of the preceding and/or following examples and aspects, the system 500 also includes a torque tool 650 having a torque-tool rotational axis 652 and an elongated torque-tool handle 654 having a longitudinal torque-tool-handle axis 656, substantially perpendicular to the torque-tool rotational axis 652 with the torque tool 650 coupled to the elongated torque-tool handle 654. The torque tool 650 includes a motor 658, which rotates an output shaft 660. A socket 662 may be coupled to the output shaft 660 for driving a headed fastener (not shown). The torque tool 650 is used to apply a specified torque to fasteners used for coupling the vertical spars 261 and the rib structures 246.

In one aspect of the disclosure, which may include at least a portion of the subject matter of any of the preceding and/or following examples and aspects, the torque tool 650 includes a torque sensor 664.

In one aspect of the disclosure, which may include at least a portion of the subject matter of any of the preceding and/or following examples and aspects, the torque sensor 664 is communicatively coupled with the controller 400 (FIG. 6) to transmit signals associated with an applied torque. The signals associated with the applied torque are transmitted to the controller 400 via a transmitter 666, which may be incorporated into the torque tool 650.

Referring once again to FIG. 7, in one aspect of the disclosure, which may include at least a portion of the subject matter of any of the preceding and/or following examples and aspects, the workpiece includes a plurality of processing locations 528. As illustrated in FIG. 10, the system 500 also includes a torque-tool jig 260, configured to selectively locate the torque tool 650 at one of the plurality of processing locations 528. The torque tool jig 260 depicted in FIG. 10 is self-contained. Alternatively, the torque tool jig 260 may be incorporated into a reaction apparatus or tool 200, to be described hereinafter.

In one aspect of the disclosure, which may include at least a portion of the subject matter of any of the preceding and/or following examples and aspects, the torque tool jig 260 may also include a plurality of torque-tool-jig-location identifiers 670 thereon.

In one aspect of the disclosure, which may include at least a portion of the subject matter of any of the preceding and/or following examples and aspects, the system 500 may also include a torque-tool-location identifier 672 (FIG. 3) on one of the torque tool 650 and the elongated torque-tool handle 654. The torque-tool-location identifier 672 may be located on any part of the torque tool 650, including the elongated torque-tool handle 654. Each of the torque-tool-jig-location identifiers 670 and the torque-tool-location identifier 672 includes an RFID device. The RFID devices associated with the torque tool 650 may be the structural and functional equivalents of the RFID devices of the rotary drive 502 and the rotary-drive jig 540, and enable location data to be transmitted to the controller 400. The transmitter 666 (shown as a device separate from the torque-tool location identifier 672 in FIGS. 6 and 10), may be used to transmit signals indicative of the location of the torque tool 650 relative to the workpiece to the controller 400.

Referring now to FIG. 4, in an example of the disclosure, which may include at least a portion of the subject matter of any of the preceding and/or following examples and aspects, the system 500 also includes a reaction apparatus or reaction tool 200, configured to apply reactive forces to fasteners torqued by the torque tool 650. The reaction tool 200 will described with reference to FIGS. 4 and 11-15, below.

Referring to one example of the reaction tool, FIG. 4 illustrates a reaction apparatus or tool apparatus, generally 200, having a platform, or body portion, generally, 202, which carries a crank arm arrangement, generally 204, which is actuated by a pneumatic cylinder, generally 206. More specifically, crank arm arrangement 204 includes a crank arm 208 which moves between a first, or "torquing", position, as shown in solid lines in FIG. 14, and a second, or "release", position, as shown in dashed lines in FIG. 14.

Crank arm 208 is connected to pneumatic cylinder 206 via a clevis coupling 210 about which a first end 208a of crank arm 208 is pivotally connected. The second end 208b of crank arm 208 is fixedly attached to a cam member 212, having a generally eccentric lobe, or cam, portion 214. Crank arm arrangement 204 is configured such that as pneumatic cylinder 206 is activated (via air pressure being supplied via hoses 216, the shaft 220 of the pneumatic cylinder 206 advances, which in turn advances clevis coupling 210 connected thereto, which in turn moves crank arm 208 from the torquing position to the "release" position. This movement of crank arm 208, in turn, causes the lobed, or cam portion 214 of cam member 212 to rotate clockwise from a torquing position to a "release" position.

An actuator, or reaction bar, generally 222, is configured for general rectilinear motion with respect to body portion 202 between a first, or "torque", position (as shown in solid lines in FIG. 14) and a second, or "release", position (as shown in dashed lines in FIG. 14). In the first position, reaction bar 222 reacts to torque applied to the fasteners (which in one example could be a bolt or washer (none shown) or a nut, generally F (FIG. 12) by restraining one or more of the fastener structures, or retaining elements, 226 from movement in the direction in which the torque is being applied. In the second position, reaction bar 222 facilitates the simultaneous substantial elimination of torque in fastener structures 226 by permitting, for example, a relatively slight movement of the fastener structures 226 relative to the fasteners in generally the direction in which the torque was applied. In other words, reaction bar 222 moves to the right away from the direction of a torque preload previously induced in socket structures 236 (discussed below) in order to eliminate the torque preload induced in socket structures 236. The dashed lines in FIG. 14 represent the unloaded, or release, position of reaction bar 222, and the solid lines represent the torque reaction, or preload, position.

This movement of reaction bar 222 is caused by the movement of cam member 212 back and forth through an arc (which may be as short as ¼ inch or less) as crank arm 208 is moved between the "torque" and "release" positions. In one example, cam member 212 extends through an opening 224 in reaction bar 222, and engagement of cam portion 214 of cam member 212 causes the rectilinear motion of reaction bar 222 between the "torque" and "release" positions.

A plurality of fastener structures, or retainer elements, or fastener retainers, generally 226, is carried forwardly of and extends outwardly from body portion 202. Each fastener retainer 226 is carried within a socket rail, or carrier assembly, generally 228. Socket carrier assembly 228 is connected to a support, or support bar, generally 230 (FIG. 4), via spacers 232 which carry fasteners 234 which fasten socket carrier assembly to support bar 230. Each fastener retainer 226 includes a socket structure, generally 236, which includes an opening 236a and a generally cylindrical sleeve, or skirt, portion 236b in communication with opening 236a. As shown in FIG. 14, generally adjacent the opposite end of the skirt 236b is a fastener socket, or, simply "socket," 237 defining an engagement profile 237a configured to engage the lands of a fastener, such as a nut or bolt head (not shown). While engagement profile 237a is illustrated for use in connection with a nut or bolt head, it is to be understood that it could be configured to engage the driving surfaces of a screw or some other fastener, if desired.

Socket structures 236 also include a rim portion 236c (FIGS. 12 and 13) which is of greater diameter than an opening of socket carrier assembly 228 in which each socket structure 236 is carried. Because it is of greater diameter than the opening of the socket carrier assembly 228, rim 236c serves to retain socket structure 236 within opening 238 in the sense that a socket structure 236 can only move outwardly so far within the opening before rim 236c engages the surfaces of socket carrier assembly 228 adjacent such opening. While only one socket structure 236 has been discussed, it is to be understood that this arrangement is found in the plurality of fastener retainers 226 along the length of socket carrier assembly 228.

Engagement profile 237a of fastener socket 237, while extending into socket structure 236, is preferably constructed of tool steel or some other suitable material in order to provide sufficient torque against a fastener when reaction apparatus or tool 200 is put into use. Socket skirt 236b, is in essence a sleeve which is movable along the length of a generally cylindrical surface of fastener socket 237, but is biased to the outermost position (where rim 236c engages the surfaces around the opening of socket carrier assembly 228 by a biasing structure), which could in one embodiment include a wave spring, or washer arrangement, generally 242. Wave spring washers 242 outwardly bias socket sleeve 236b and, in a manner discussed in more detail below, permit socket sleeve 236b to engage against the surfaces proximate a fastener, such as the threaded end of a bolt (not shown), in a secure manner, such that a nut F (FIG. 12) and one or more washers, generally W (FIG. 12) which are carried in socket sleeve 236b do not come loose or fall out of socket sleeve 236b. This arrangement permits such washers and nut, in one embodiment, to be securely maintained in proper orientation in order for the nut to be threadingly installed onto the threaded end of the bolt. Wave spring washers 242, by allowing a socket sleeve 236b to float or give somewhat if it impinges a surface, may also increase the spatial conformity of socket carrier assembly 228 and facilitate advancement of socket carrier assembly 228 and fastener retainers 226 (together with the fasteners held therein) into a difficult-to-access area, such as beneath a relatively low-clearance structure or flange, and/or such as a closed angled flange 244 of a structure, such as a rib structure 246 (FIG. 15).

Fastener socket 237 is configured for pivoting within socket carrier assembly 228. Fixedly attached to each socket 237 is a lever, or reaction, arm 250 which rotates, pivots, or otherwise moves with socket 237 with respect to socket carrier assembly 228. However, movement of sockets 237 and reaction arm 250 is limited to that permitted by the gap, generally 252, between outwardly extending tabs 254 provided on reaction bar 222 and reaction arms 250. As shown in FIG. 14, the forward edge 256 of a reaction arm 250 engages with abutment surface 258 of a tab 254 proximate a particular fastener retainer 226 when torque is applied to a fastener (not shown). In other words, once washers and a nut (not shown) held in a socket structure 236 are presented to the threaded end of a bolt (also not shown), and the bolt is tightened (using, e.g., a commercially available torque applicator or a plurality thereof) such that torque passes through the bolt to the nut retained by socket 237, the torque is transferred from the nut to socket 237, and in turn to the reaction arm 258 connected thereto. Those skilled in the art will appreciate that the torque is similarly transferred if socket 237 instead retains the head of the bolt (not shown) when a nut (also not shown) is being tightened at the opposite end of the bolt. The forward edge 256 of reaction arm 250 transfers this torque to abutment surface 258 of a tab 254 of reaction bar 222 proximate such reaction arm 250. Torque is transferred in the above-described manner when reaction bar 222 is fixed in the first, or "torque", position as shown in solid lines in FIG. 14.

Once the bolt has been tightened to a predetermined torque, the associated nut is positively engaged by and frictionally bound within the socket 237, in which it is located. This binding, or friction, between the nut or bolt head (not shown) and socket 237 makes it difficult to withdraw the socket from the nut without first releasing the torsional load still being transferred from socket 237 to reaction arm 250, and on to tab 254 of fixedly positioned reaction bar 222. In order to release this frictional torque-induced coupling of the socket 237 with the nut or bolt head (not shown), reaction bar 222 is moved to the right (as shown in FIG. 14) from its "torque" position indicated by solid lines to the "release" position indicated by dashed lines. Once in the release position, with the torque load now being relieved from socket 237, a gap 255 may be formed between the right side of reaction arm 250 and tab 254 (as shown in dashed lines in FIG. 14). This movement of reaction bar 222 is caused by the clockwise rotation of cam member 212 within opening 224 of reaction bar 222 such that the cam portion 214 of cam member 212 forces reaction bar 222 to the right (to the "release" position), thereby releasably reacting to the applied torque induced in socket 237. Referring once again to FIG. 14, the rotation of cam member 212 is caused by crank arm 208 being moved to the right from the position indicated by solid lines to the position indicated by dashed lines, and this movement of crank arm 208 is caused by the outward extension of shaft 220 from pneumatic cylinder 206.

When reaction bar 222 is moved to the "release" position, the torque load placed on socket 237 is relieved to the extent that socket 237 can readily be retracted, via retraction of support bar 230 in a manner discussed below, and disengaged from the torqued nut.

Referring to FIG. 11, also attached to body portion 202 is a socket wrench guide assembly, generally 260, having attachment flanges, generally 262*a*, 262*b*, 262*c*, which attach socket wrench guide assembly 260 to body portion 202. Socket wrench guide assembly or torque tool jig 260 defines a plurality of recesses, generally 264, which serve to receive and guide an elongated shaft of a socket wrench (not shown). Self-contained jigs, such as the rotary-drive jig 540, the probe jig 610, and the torque-tool jig 260, may be incorporated into a component of the system 500, just as the socket wrench guide assembly 260 is incorporated into the reaction apparatus or tool 200. Socket wrench guide assembly 260 may be used to guide and support such a socket wrench during the tightening of bolts, ordinarily when fastening an adjacent rib structure spaced apart from the rib structure whose fasteners are engaged by sockets 237.

Referring to FIG. 11, also attached to body portion 202 are upstanding pneumatic cylinders 266 and 268 which are connected via hoses, generally 270, to an external compressed-air supply 402 (FIG. 4). Pneumatic cylinders 266, 268 operate in a manner discussed in more detail below to extend and retract index pins 272, 274 (FIG. 11) when the reaction apparatus or tool 200 is attached to a rib structure 246.

Brackets 276, 278 are also provided on body portion 202 and may be used for a variety of purposes, including, for attachment of a quick connect extension handle (not shown), which may be used for inserting reaction apparatus or tool 200 and the rib structure 246 into the cavity or remote location, such as the rib bay 279 (FIG. 4) of the airplane horizontal stabilizer or wing structure. Such quick disconnect extension handle may also facilitate the removal of tool 200 from a rib bay 279, upon reaction apparatus or tool 200 being removed from a rib structure 246 after the torquing of fasteners (such as bolts) in flange 244. It is noted that a reaction apparatus or tool 200 could be placed in adjacent rib bays 279 and 281, and the socket wrench guides 260 of a reaction apparatus or tool 200*a* (similar to the tool 200) in rib bay 281 could be used to tighten the bolts (not shown) to which the washers and nuts are being held by the reaction apparatus or tool 200 in rib bay 279. Alternately, instead of using a complete reaction apparatus or tool 200*a* in rib bay 281, a scaled down version without some of the mechanisms discussed above could be used.

Referring now to FIG. 12, which shows the other side of one embodiment of a reaction apparatus or tool 200, retractable index pins 272, 274 are shown in their retracted configuration. Additional index pins 280, 282 are also provided on this side of body portion 202. Index pins 280, 282 could be fixed, or also retractable, as desired. If such pins are fixed, they would in one embodiment be used to position the reaction apparatus or tool 200 on a structure, such as rib structure 246, by engaging index holes in such rib structure. Upon such index pins 280, 282 being in place, retractable index pins 272, 274 could be advanced outwardly by activation of pneumatic cylinders 266, 268, respectively, into additional index holes (not shown) in rib structure 246. This provides four engagement points, namely, four pins received in four index holes of rib structure 246 to securely and positively locate tool 200 with respect to rib structure 246. Activation of pneumatic cylinders 266, 268 could take place directly or remotely from reaction apparatus or tool 200 if desired while reaction apparatus or tool 200 is outside of rib bay 279, but once tool 200 is in rib bay 279, activation of pneumatic cylinders 266, 268 takes place remotely, from outside of rib bay 279 after the fastener installation and torquing process has been completed.

Referring once again to FIG. 12, reaction apparatus or tool 200 is held against rib structure 246 via a vacuum arrangement, using vacuum cups 284, 286 (which are attached to body portion 202). Vacuum cups 284, 286 are each connected to a vacuum generator and/or an external air and/or vacuum supply 402, 404 (FIG. 4) is used to cause a vacuum to be drawn by vacuum cups 284, 286, thereby securing reaction apparatus or tool 200 to rib structure 246, preferably once index pins 272, 274, 280, and 282 have already been inserted into their respective index holes in rib structure 246. Activation of vacuum cups 284, 286 could take place directly or remotely from reaction apparatus or tool 200 if desired while reaction apparatus or tool 200 is outside of rib bay 279, but once tool 200 is in rib bay 279, activation of vacuum cups 284, 286 takes place remotely, from outside of rib bay 279 in order to decouple reaction apparatus or tool 200 from rib structure 246 after the fastener installation and torquing process has been completed.

Once reaction apparatus or tool 200 is attached to rib structure 246, socket carrier assembly 228 is advanceable towards closed angle flange 244 of rib structure 246. Prior to such advancement, in one embodiment, the desired washers and nuts (not shown) have already been loaded into the individual socket structures 236. Advancement of socket carrier assembly 228 forward allows the extreme forward end of each socket structure 236 to contact surfaces of flange 244 adjacent the threaded ends of bolts (not shown), which extend through openings 288 of closed angle flange 244. Once this contact has been made, further advancement of socket carrier assembly 226 would tend to compress wave spring washers 242.

Advancement of socket carrier assembly 228 is provided by advancement of support bar 230 to which socket carrier assembly 228 is attached. Support bar 230 is movable via a linkage structure, generally 290, which includes link arms 292, 294, each having one end pivotally attached to a pillow block bearing 296, 298 respectively of support bar 230. The other end of each link arm arrangement 292, 294 is connected to a pivotal bearing 299 provided on a longitudinally extending linkage bar 300 which is carried for generally rectilinear motion between a retracted position and an extended position. Support bar 230 includes at one end a linear bearing 306 and at the other end a linear bearing 308 (FIG. 11), which allow support bar 230 to move between the retracted position and the extended position. Linkage bar 300 is connected to a shaft 318 of a pneumatic cylinder 320 such that advancement and retraction of shaft 318 by a support actuator, such as pneumatic cylinder, 320 causes corresponding advancement and retraction of linkage bar 300 which, through the linkage arrangement discussed above, causes advancement and retraction of socket carrier assembly 228 and sockets 236 thereon. Pneumatic cylinder 320 is provided with pressurized air from external source 402 via hoses 322. Advancement and retraction of socket carrier assembly 228 could take place directly or remotely from tool 200 if desired while reaction apparatus or tool 200 is outside of rib bay 279, but once tool 200 is in rib bay 279, retraction of socket carrier assembly 228 takes place remotely, from outside of rib bay 279 in order to decouple tool 200 from rib structure 246 after the fastener installation and torquing process has been completed.

Hoses 270 and 322 are preferably bundled and carried within an umbilical 324 (FIG. 15) to the external pressurized air/vacuum sources discussed above.

As shown in FIG. 15, a roller and/or caster arrangement, generally 326, is provided on what becomes the lower edge of body portion 202 when reaction apparatus or tool 200 is attached to rib structure 246 (preferably on a workbench or other location outside of a rib bay or other cavity). As the combined rib structure/tool is inserted into place, it may be in one embodiment vertically disposed, such that roller/caster arrangement 326 is proximate a contact surface 327 (FIG. 4) on which reaction apparatus or tool 200 may be supported by such roller/caster arrangement 326 upon reaction apparatus or tool 200 becoming disengaged from rib structure 246. This disengagement typically occurs after the fasteners have been installed by sockets 236, the torque loads have been released therefrom through reaction bar 222 being moved to the "release" position (as discussed above), index pins 280, 282 being retracted by pneumatic cylinders 266, 268, and vacuum cups 284, 286 deactivated. Thus, once tool 200 has been released from rib structure 246, it can then be supported by roller/caster arrangement 326 and withdrawn from the rib bay or other cavity for example through use of a quick connect extension handle (not shown) discussed above.

FIG. 13 illustrates a further example embodiment of the disclosure and shows reaction apparatus or tool 200', which is similar to reaction apparatus or tool 200 in operation and construction, but has some variations in the design of vacuum cups 284' and 286' as well as index pin devices 272', 274', 280', and 282', and in linkage structure 290'. FIG. 13 illustrates linear bearings 302, 304 which are used by linkage structure 290' for rectilinear movement between the retracted and advanced positions.

A method of using reaction apparatus or tool 200 may include: loading a fastener such as a nut and one or more washers in each fastener retainer 226 (while support bar 230 is in the retracted position); positioning reaction apparatus or tool 200 over rib structure 246; aligning one or more fixed index pins 280, 282 with holes in rib structure 246 (retractable index pins 272, 274 would be in a retracted position to facilitate access of the socket carrier assembly 228 to pass under closed angle flange 244); using vacuum cups 284, 286 to attach reaction apparatus or tool 200 to rib structure 246; extending the retractable index pins 272, 274 into index holes (not shown) in rib structure 246; and extending support bar 230 such that socket structures 236 are in contact with the closed angle flange 244 to ensure full socket engagement.

Reaction apparatus or tool 200 and rib structure can be thus loaded together as a single unit into a channel, such as a rib bay 279 (FIG. 4) through use of one or more quick release handles (not shown), which releasably attach to brackets 276 and/or 278.

During the fastener torquing process, pneumatic cylinder 206 is in a retracted position, which moves reaction bar 222 to the left-most position shown in FIG. 14. All reaction arms 250 are held simultaneously by reaction bar 222 during the torquing procedure. Accordingly, arms 250 transmit to reaction bar 222 the cumulative preload torque force from all fasteners. It is this cumulative force that is to be released, via the motion of reaction bar 222 to the right-most position shown in FIG. 14, to free up all of the socket structures 236.

To release the torque preload, shaft 220 of pneumatic cylinder 206 will extend, thereby causing clockwise rotation of crank arm 208 and corresponding rotation of elongated member, or reaction cam, 212, which in turn moves reaction bar 222 in a direction away from reaction arms 250. The cam portion 214 is situated where the high point of the cam profile is naturally biased to move towards the "release" position, thereby reducing the force required by pneumatic cylinder 206 to release the torque preload through reaction bar 222.

Removal of reaction apparatus or tool 200 from a channel, such as rib bay 328, is accomplished (after the removal of the torque preload has been performed as discussed above) by reattaching one or more quick connect extension handles (not shown), which releasably attach to brackets 276 and/or 278. Retractable index pins 272, 274 are retracted from index holes (not shown) in rib structure 246, and vacuum cups 284, 286 are deactivated, thereby disengaging reaction apparatus or tool 200 from rib structure 246 and allowing tool 200 to drop slightly from rib structure 246 to a surface such as floor 330 of rib bay 328. At this point, reaction apparatus or tool 200 is supported on rollers and/or casters 326 and may be drawn from rib bay 328 on such casters using the quick connect extension handles.

As can be seen from the foregoing, reaction apparatus or tool 200 facilitates the attachment thereto to a rib structure 246 remote from a cavity or channel, and such could take place at an ergonomically friendly bench height, if desired.

Use of tool 200 may also reduce potential foreign object debris (FOD) issues of dropped washers or nuts in such cavity or channel.

The remote control operation of reaction apparatus or tool 200, including the actuation of its pneumatic cylinders 206, 266, 268, and 320, can be manually actuated through use of manually controlled valves (none shown) for actuating pneumatic cylinders 206, 266, 268, and 320 and/or actuated by the processor (controller), generally 400, if desired, which may be connected to the pressurized air supply, generally 402, which could be external to or carried by reaction apparatus or tool 200 and/or the vacuum supply 404, which could also be external to or carried by reaction apparatus or tool 200. Processor 400 may be configured to be: an index pin actuator, controlling pressurized air to pneumatic cylinders 206 and 266; a support actuator, controlling pressurized air to pneumatic cylinder 320; a reaction bar actuator, controlling pressurized air to pneumatic cylinder 206; and/or a vacuum actuator for controlling supply of vacuum to vacuum cups 284, 284', 286, and 286', if desired.

The processor 400 is generally any piece of hardware that is capable of processing information such as, for example, data, computer-readable program code, instructions or the like (generally "computer programs," e.g., software, firmware, etc.), and/or other suitable electronic information.

Referring to FIGS. 16A-16C, one example of the present disclosure relates to a method 700 of processing the workpiece. The method 700 includes identifying processing locations 528 (FIG. 7) on the workpiece (block 702); drilling a first hole at one of the processing locations 528 using the rotary drive 502 of FIG. 3 (block 704); sensing the flow of the fluid associated with operating the rotary drive 502 while drilling the first hole (block 706); generating an operation signal responsive to the flow of the fluid associated with operating the rotary drive 502 and not generating the operation signal responsive to an absence of the flow of the fluid associated with operating the rotary drive 502 (block 708); comparing a duration interval of the operation signal to a predetermined temporal value (block 710); and drilling a different hole at a different one of the processing locations 528 if the duration interval of the operation signal is greater than or equal to the predetermined temporal value and not drilling the different hole if the duration interval of the operation signal is less than the predetermined temporal value (block 712).

In one aspect of the disclosure, which may include at least a portion of the subject matter of any of the preceding and/or following examples and aspects, drilling the different hole at the different one of the processing locations 528 (block 704) also includes one of a) drilling the different hole if both the duration interval of the operation signal is greater than or equal to the predetermined temporal value and the different hole is not located at a previously drilled location of the processing locations 528 (block 714); and b) not drilling the different hole if either the duration interval of the operation signal is less than the predetermined temporal value or the different hole is located at the previously drilled location of the processing locations 528 (block 716). Those skilled in the art will appreciate that the different hole will not be drilled if both the duration interval of the operation signal is less than the predetermined temporal value and the different hole is located at the previously drilled location.

As used herein, the first hole is not necessarily the initial one of a series of holes to be drilled, but a hole after which another hole of the series of holes (e.g., the different hole) will chronologically be drilled. Furthermore, reference to drilling the first hole and the different (second) hole also contemplates drilling three or more holes.

In one aspect of the disclosure, which may include at least a portion of the subject matter of any of the preceding and/or following examples and aspects, the method 700 also includes inspecting a first drilled hole of at least one drilled hole to determine at least one parameter of the first drilled hole (block 718); generating a parameter signal responsive to inspecting the first drilled hole, wherein the parameter signal is associated with the at least one parameter of the first drilled hole (block 720); comparing the at least one parameter of the first drilled hole to at least one quality standard (block 722); and inspecting a different drilled hole if the at least one parameter of the first drilled hole meets the at least one quality standard and not inspecting the different drilled hole if the at least one parameter of the first drilled hole does not meet the at least one quality standard (block 724). Those skilled in the art will appreciate that the at least one drilled hole may be one of a plurality of drilled holes. The at least one parameter of a drilled hole may encompass hole diameter, hole surface finish, etc., as described above. Inspection of the drilled hole(s) may be performed using the probe 600 of FIG. 6. Quality standards associated with the method 700 may encompass those parameters which may be sensed by the probe 600, for example.

In one aspect of the disclosure, which may include at least a portion of the subject matter of any of the preceding and/or following examples and aspects, inspecting the different drilled hole also includes one of 1) inspecting the different drilled hole if the at least one parameter of the first drilled hole meets the at least one quality standard and the different drilled hole has not been previously inspected (block 726); and 2) not inspecting the different drilled hole if either the at least one parameter of the first drilled hole does not meet the at least one quality standard or the different drilled hole has been previously inspected (block 728).

In one aspect of the disclosure, which may include at least a portion of the subject matter of any of the preceding and/or following examples and aspects, the at least one parameter of the first drilled hole is an at least one first parameter, the at least one quality standard is an at least one first quality standard, and the method 700 also includes inspecting the different drilled hole to determine if an at least one second parameter of the different drilled hole meets an at least one second quality standard (block 730). For example, the at least one first parameter of the first drilled hole may be a diameter having an associated first quality standard, such as a size tolerance of e.g., +0.006/−0.003 inch (+0.015/−008 millimeter), and the at least one second parameter of the different drilled hole may be a surface finish having an associated second quality standard, for metal structures, of 15-30 microinches (38-76 micrometers). Those skilled in the art will appreciate that the at least one first parameter and the at least one second parameter may be the same or different parameters. Furthermore, each of the at least one first parameter and the at least one second parameter may be single or multiple parameters.

In one aspect of the disclosure, which may include at least a portion of the subject matter of any of the preceding and/or following examples and aspects, the method 700 also includes installing a first fastener in a designated drilled hole in the workpiece and torquing the first fastener (block 732); generating a torque signal indicative of a torque applied to the first fastener (block 734); comparing the torque to a predetermined torque value (block 736); installing a different fastener in a different designated drilled hole (block 738); and torquing the different fastener if the torque applied to the first fastener matches the predetermined torque value and not torquing the different fastener if the torque applied to the first fastener does not match the predetermined torque value (block 740). Torque values encompass discrete values and also ranges of values. Also, torque values for any two fasteners may be identical or may be different.

In one aspect of the disclosure, which may include at least a portion of the subject matter of any of the preceding and/or following examples and aspects, torquing the different fastener also includes one of (a) torquing the different fastener if the torque applied to the first fastener matches the predetermined torque value and the first fastener has not been previously torqued (block 742); and (b) not torquing the different fastener if either the torque applied to the first fastener does not match the predetermined torque value or the first fastener has been previously torqued (block 744).

In one aspect of the disclosure, which may include at least a portion of the subject matter of any of the preceding and/or following examples and aspects, the method 700 also includes retorquing the first fastener (block 746); generating a retorque signal indicative of a subsequent torque applied to the first fastener (block 748); comparing the subsequent torque to a predetermined retorque value (block 750); and retorquing the different fastener if the subsequent torque applied to the first fastener matches the predetermined retorque value and not retorquing the different fastener if the subsequent torque applied to the first fastener does not match the predetermined retorque value (block 752).

In one aspect of the disclosure, which may include at least a portion of the subject matter of any of the preceding and/or following examples and aspects, the method 700 also includes one of (a) retorquing the different fastener if both the subsequent torque applied to the first fastener matches the predetermined retorque value and the different fastener has not been previously retorqued (block 754); and (b) not retorquing the different fastener if either the subsequent torque applied to the first fastener does not match the predetermined retorque value or the different fastener has been previously retorqued (block 756).

In one aspect of the disclosure, which may include at least a portion of the subject matter of any of the preceding and/or following examples and aspects retorquing the different fastener also includes one of (a) retorquing the different fastener if the subsequent torque applied to the first fastener matches the predetermined retorque value, the different fastener has not been previously retorqued, and a predetermined time interval following torquing the first fastener has elapsed (block 758); and (b) not retorquing the different fastener if either the subsequent torque applied to the first fastener does not match the predetermined retorque value, the different fastener has been previously retorqued, or the predetermined time interval following torquing the first fastener has not elapsed (block 760).

The disclosure and drawing figure(s) describing the operations of the method 700 set forth herein should not be interpreted as necessarily determining a sequence in which the operations are to be performed. Rather, although one illustrative order is indicated, it is to be understood that the sequence of the operations may be modified when appropriate. Additionally, in some aspects of the disclosure, not all operations described herein need be performed.

For example, individual operations (i.e., those shown in the blocks 702-760) of the method 700 may be performed in different sequences, where feasible. For example, there is the possibility of fully processing a single processing location (such as the processing location 528 of FIG. 7) before processing the next processing location. Fully processing the single processing location 528 may include drilling a hole at the selected single processing location 528, inspecting the drilled hole to assure conformity to the quality standard(s), reworking the drilled hole if necessary to bring the drilled hole into conformity with the quality standard(s), installing a fastener in the drilled hole, torquing the fastener, and if called for in a given assembly, retorquing the fastener. As an alternative, each individual operation, such as a drilling operation, may first be performed for some or all of the processing locations 528, with subsequent operations, such as inspection, being performed for some or all of the above-mentioned processing locations.

Different examples and aspects of the apparatus and methods are disclosed herein that include a variety of components, features, and functionality. It should be understood that the various examples and aspects of the apparatus and methods disclosed herein may include any of the components, features, and functionality of any of the other examples and aspects of the apparatus and methods disclosed herein in any combination, and all of such possibilities are intended to be within the spirit and scope of the present disclosure.

Many modifications and other examples of the disclosure set forth herein will come to mind to one skilled in the art to which the disclosure pertains having the benefit of the teachings presented in the foregoing descriptions and the associated drawings.

Therefore, it is to be understood that the disclosure is not to be limited to the specific embodiments disclosed and that modifications and other embodiments are intended to be included within the scope of the appended claims. Moreover, although the foregoing descriptions and the associated drawings describe example embodiments in the context of certain illustrative combinations of elements and/or functions, it should be appreciated that different combinations of elements and/or functions may be provided by alternative implementations without departing from the scope of the appended claims.

What is claimed is:

1. A method of processing a workpiece, the method comprising:
   identifying processing locations on the workpiece;
   drilling a first hole at one of the processing locations using a rotary drive;
   sensing a flow of a fluid associated with operating the rotary drive while drilling the first hole;
   generating an operation signal responsive to the flow and not generating the operation signal responsive to an absence of the flow, wherein the operation signal, if generated, has a duration interval corresponding to an operation duration of the rotary drive;
   comparing the duration interval of the operation signal to a predetermined temporal value; and
   drilling a different hole at a different one of the processing locations if the duration interval of the operation signal is greater than or equal to the predetermined temporal value, and not drilling the different hole if the duration interval is less than the predetermined temporal value.

2. The method of claim 1, wherein drilling the different hole at the different one of the processing locations further comprises one of:
   drilling the different hole, if both the duration interval of the operation signal is greater than or equal to the predetermined temporal value and if the different hole is not located at a previously drilled location of the processing locations; or not drilling the different hole, if either the duration interval of the operation signal is less than the predetermined temporal value or the different hole is located at the previously drilled location of the processing locations.

3. The method of claim 2, further comprising:
inspecting a first drilled hole of at least one drilled hole to determine at least one parameter of the first drilled hole;
generating a parameter signal responsive to inspecting the first drilled hole,
wherein the parameter signal is associated with the at least one parameter of the first drilled hole;
comparing the at least one parameter of the first drilled hole to at least one quality standard; and
inspecting a different drilled hole, if the at least one parameter of the first drilled hole meets the at least one quality standard, and not inspecting the different drilled hole if the at least one parameter of the first drilled hole does not meet the at least one quality standard.

4. The method of claim 3, wherein the at least one parameter of the first drilled hole comprises a parameter selected from the group consisting of hole diameter, hole surface finish, hole roundness, hole depth, hole angle relative a surface of the workpiece, and burr presence.

5. The method of claim 3, wherein inspecting the different drilled hole further comprises one of:
inspecting the different drilled hole, if the at least one parameter of the first drilled hole meets the at least one quality standard and if the different drilled hole has not been previously inspected; or
not inspecting the different drilled hole, if either the at least one parameter of the first drilled hole does not meet the at least one quality standard or the different drilled hole has been previously inspected.

6. The method of claim 5, further comprising inspecting the different drilled hole to determine if an at least one second parameter of the different drilled hole meets at least one second quality standard.

7. The method of claim 6, wherein the at least one second parameter of the different drilled hole is identical to the at least one parameter of the first drilled hole.

8. The method of claim 6, wherein the at least one second parameter of the different drilled hole is different from the at least one parameter of the first drilled hole.

9. The method of claim 2, further comprising:
installing a first fastener in a designated drilled hole in the workpiece and torquing the first fastener;
generating a torque signal indicative of a torque applied to the first fastener;
comparing the torque to a predetermined torque value;
installing a different fastener in a different designated drilled hole; and
torquing the different fastener, if the torque applied to the first fastener matches the predetermined torque value and not torquing the different fastener if the torque applied to the first fastener does not match the predetermined torque value.

10. The method of claim 9, wherein torquing the different fastener further comprises one of:
torquing the different fastener, if the torque applied to the first fastener matches the predetermined torque value and if the first fastener has not been previously torqued; or not torquing the different fastener, if either the torque applied to the first fastener does not match the predetermined torque value or the first fastener has been previously torqued.

11. The method of claim 10, further comprising:
retorquing the first fastener;
generating a retorque signal indicative of a subsequent torque applied to the first fastener while retorquing the first fastener;
comparing the subsequent torque to a predetermined retorque value; and
retorquing the different fastener, if the subsequent torque applied to the first fastener matches the predetermined retorque value, and not retorquing the different fastener, if the subsequent torque applied to the first fastener does not match the predetermined retorque value.

12. The method of claim 11, wherein retorquing the different fastener further comprises one of:
retorquing the different fastener, if both the subsequent torque applied to the first fastener matches the predetermined retorque value and if the different fastener has not been previously retorqued; or
not retorquing the different fastener, if either the subsequent torque applied to the first fastener does not match the predetermined retorque value or the different fastener has been previously retorqued.

13. The method of claim 11, wherein retorquing the different fastener further comprises one of:
retorquing the different fastener if the subsequent torque applied to the first fastener matches the predetermined retorque value, if the different fastener has not been previously retorqued, or if a predetermined time interval following torquing the first fastener has elapsed; or
not retorquing the different fastener if either the subsequent torque applied to the first fastener does not match the predetermined retorque value, the different fastener has been previously retorqued, or the predetermined time interval following torquing the first fastener has not elapsed.

14. The method of claim 1, further comprising selectively locating the rotary drive at
the one of the processing locations, corresponding to the first hole, wherein the rotary drive is selectively located using a rotary-drive jig, coupled to the workpiece.

15. The method of claim 14, wherein the rotary-drive jig comprises locating openings, each corresponding to a different one of the processing locations.

16. The method of claim 15, wherein the rotary-drive jig further comprises rotary-drive-jig location identifiers, each corresponding to a different one of the locating openings.

17. The method of claim 16, wherein:
the rotary drive comprises rotary-drive location identifier, and
selectively locating the rotary drive at the one of the processing locations comprises operationally engaging one of the rotary-drive-jig location identifiers and the rotary-drive location identifier.

18. The method of claim 17, wherein:
rotary-drive-jig location identifiers are radio-frequency identification (RFID) tags, and
the rotary-drive location identifier is an RFID reader, operable to interrogate the RFID tags.

19. The method of claim 1, wherein sensing the flow of a fluid associated with operating the rotary drive is performed using one of a flow sensor or a pressure sensor.

20. The method of claim 19, wherein the one of the flow sensor or the pressure sensor is positioned at a location, selected from the group consisting of an inlet fluid path of rotary drive, an internal fluid path of the rotary drive, and an outlet fluid path of the rotary drive.

\* \* \* \* \*